United States Patent
Jenks

(10) Patent No.: US 11,041,652 B2
(45) Date of Patent: Jun. 22, 2021

(54) 360 DEGREE SMART REPOSITIONING VALVE ACTUATOR

(71) Applicant: Johnson Controls Technology Company, Auburn Hills, MI (US)

(72) Inventor: Russell T. Jenks, Racine, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 34 days.

(21) Appl. No.: 16/261,498

(22) Filed: Jan. 29, 2019

(65) Prior Publication Data
US 2020/0240665 A1  Jul. 30, 2020

(51) Int. Cl.
| | |
|---|---|
| F24F 11/49 | (2018.01) |
| F24F 13/10 | (2006.01) |
| F24F 11/65 | (2018.01) |
| F24F 11/56 | (2018.01) |
| F24F 11/52 | (2018.01) |
| F24F 11/79 | (2018.01) |
| F24F 140/40 | (2018.01) |

(52) U.S. Cl.
CPC ............. *F24F 11/49* (2018.01); *F24F 11/52* (2018.01); *F24F 11/56* (2018.01); *F24F 11/65* (2018.01); *F24F 11/79* (2018.01); *F24F 13/10* (2013.01); *F24F 2140/40* (2018.01)

(58) Field of Classification Search
CPC .. F24F 11/49; F24F 11/52; F24F 11/56; F24F 11/65; F24F 11/79; F24F 13/10; F24F 2140/40
See application file for complete search history.

(56) References Cited

U.S. PATENT DOCUMENTS

| | | | |
|---|---|---|---|
| 6,189,507 B1 * | 2/2001 | Tsuchiya | F02D 9/1065 123/396 |
| 2013/0103989 A1 | 4/2013 | Jensen | |
| 2017/0051698 A1 * | 2/2017 | Zielinski | F02D 21/08 |
| 2017/0205121 A1 * | 7/2017 | McDonnell | F24F 13/20 |
| 2018/0322766 A1 | 11/2018 | Pierson et al. | |

OTHER PUBLICATIONS

Extended European Search Report on EP 20154245.3, dated Jun. 18, 2020, 9 pages.

* cited by examiner

*Primary Examiner* — Marc E Norman
(74) *Attorney, Agent, or Firm* — Foley & Lardner LLP

(57) ABSTRACT

A system including a valve positioned in a conduit, wherein the valve is configured to change fluid flow through the conduit. The system includes an actuator having a motor that is configured to selectively rotate the valve toward a desired valve orientation. The system is configured to receive a request for a desired valve orientation, control the motor to move the valve into the desired valve orientation, and sense a condition corresponding to a current valve orientation following movement by the motor. The system is configured to determine if the sensed condition indicates that the current valve orientation matches the desired valve orientation from the request, and, responsive to determining that the current valve orientation does not match the desired valve orientation from the request, control the motor to selectively rotate the valve in a direction to move the valve towards the desired valve orientation.

22 Claims, 12 Drawing Sheets

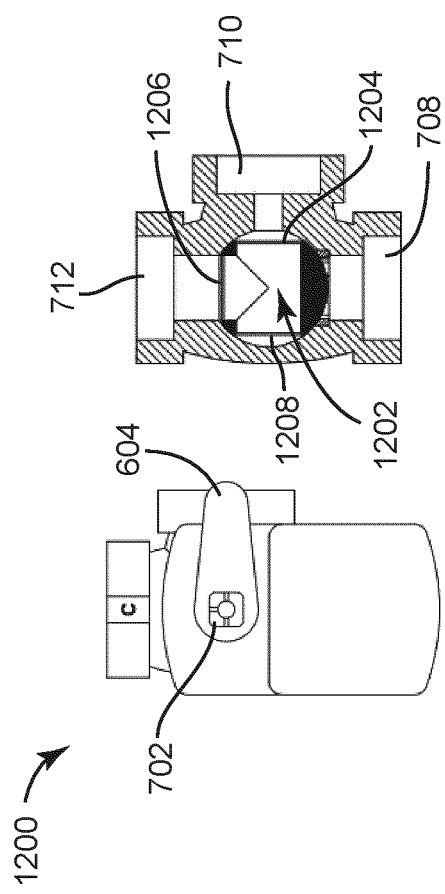
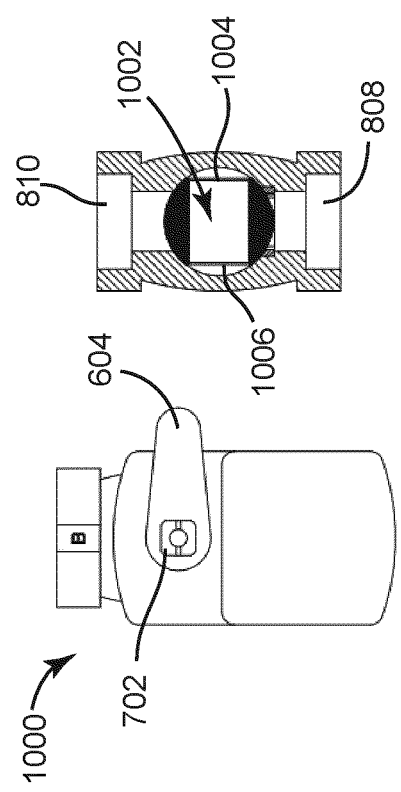
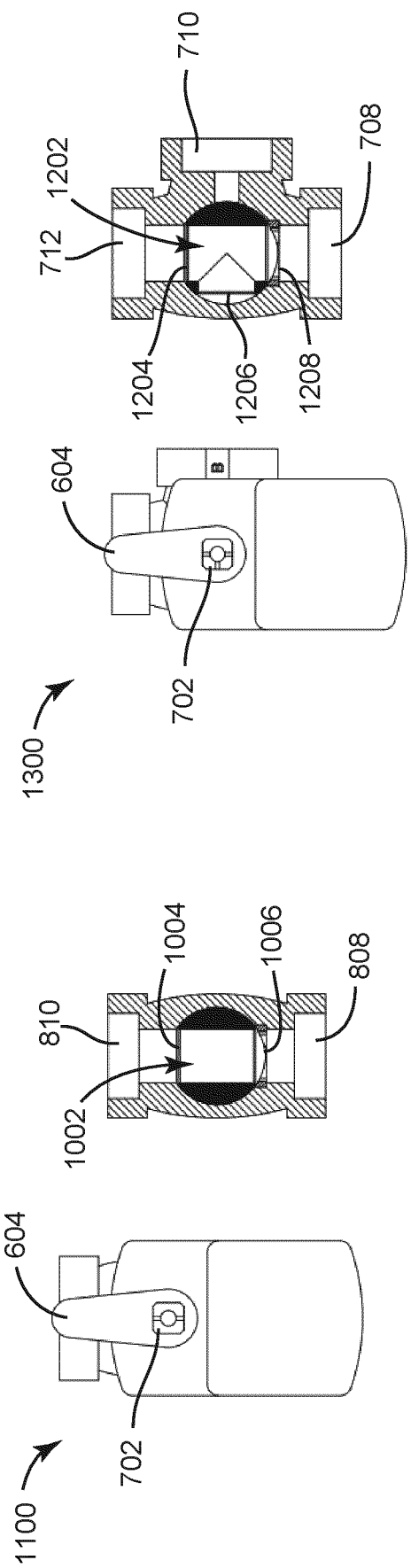
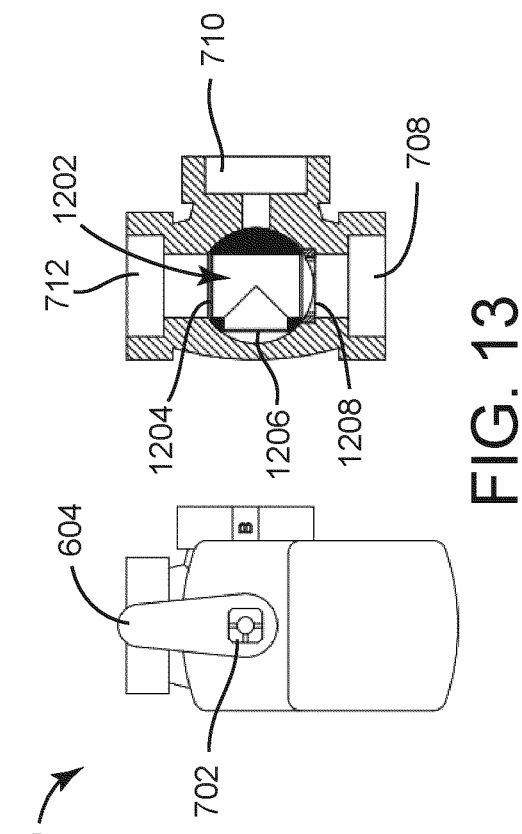
FIG. 10
FIG. 11
FIG. 12
FIG. 13

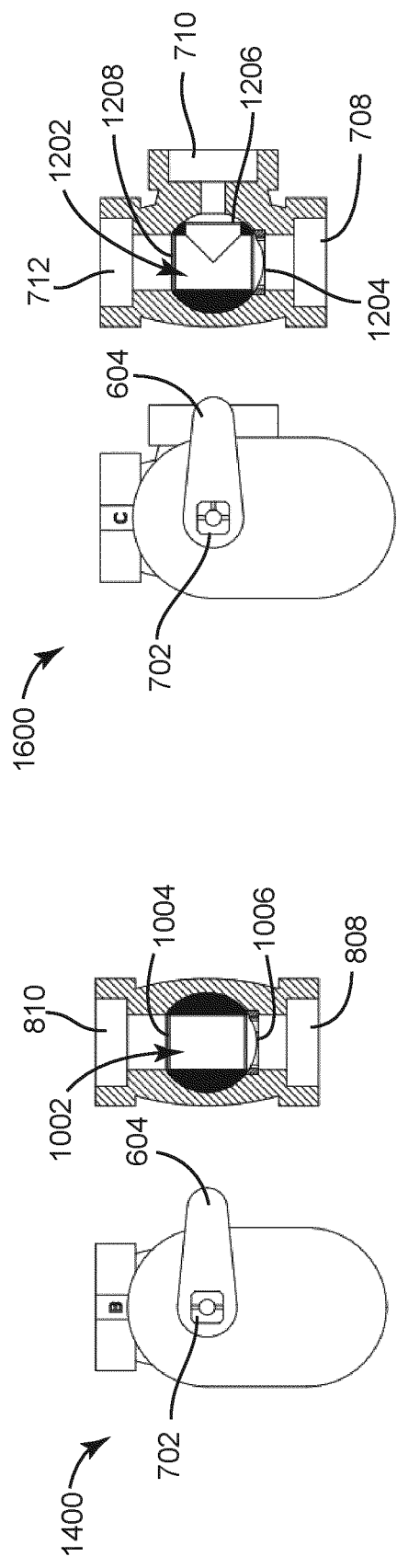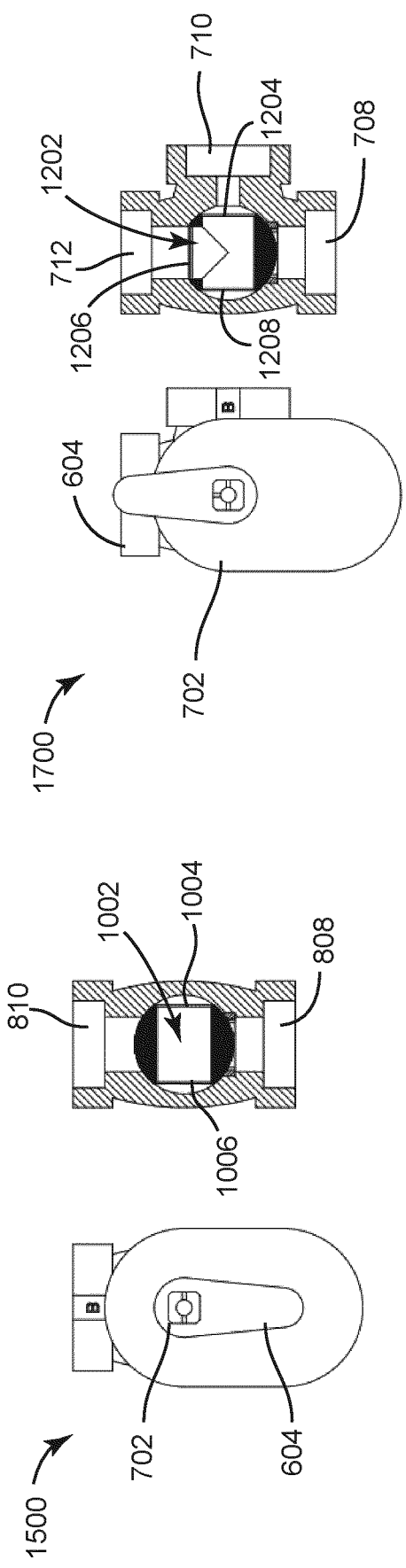

360 DEGREE SMART REPOSITIONING VALVE ACTUATOR

BACKGROUND

The present disclosure relates generally to actuators in a heating, ventilating, or air conditioning (HVAC) system and more particularly to controlling a valve change fluid flow through a conduit.

Valve actuators are used to operate a wide variety of HVAC components, such as air dampers, fluid valves, air handling units, and other components that are typically used in HVAC systems. However, a common problem in the field is valve actuators being installed onto valves out of phase. Most actuators rotate in a fixed range and they need to be placed on the valve correctly to work as designed in the application. For example, if a valve actuator is installed out of phase or improperly, the mistake might not be detected until it is turned on and operating in an opposite manner. When such a mistake is detected, an operator will need to troubleshoot to determine which way it needs to be properly oriented. Even still, due to the compact design of many HVAC systems, clearance for installing the valve actuator in the proper orientation might also be extremely tight. Accordingly, a valve actuator that is configured to have a 360-degree smart repositioning capability would be beneficial. That is, an actuator which can be installed in any of a variety of orientations, determine if installed out of phase, and to self-correct the valve orientation without having to be removed.

SUMMARY

One implementation of the present disclosure is a system for controlling a valve in a HVAC system. The system includes a valve positioned in a conduit. The valve is configured to change fluid flow through the conduit. The system further includes an actuator coupled to the valve. The valve includes a motor configured to control an orientation of the valve. The system further includes a sensor configured to sense a condition based on an orientation of the valve within the conduit. The system further includes an actuator controller. The actuator controller includes a processor and memory. The memory stores instructions that, when executed by the processor, cause the processor to receive a request for a desired valve orientation. The memory is further structured to cause the processor to control the motor to move the valve into the desired valve orientation. The memory is further structured to cause the processor to sense a condition corresponding to a current valve orientation following movement by the motor, and to determine if the sensed condition indicates that the current valve orientation matches the desired valve orientation from the request. The memory is further structured to cause the processor to, responsive to determining that the current valve orientation does not match the desired valve orientation from the request, control the motor to selectively rotate the valve in a direction to move the valve towards the desired valve orientation.

In some embodiments, responsive to determining that the current valve orientation does not match the desired valve orientation from the request, the system controls the motor to selectively rotate the valve by a multiple of 90 degrees to phase correct to the desired valve orientation.

In some embodiments, determining if the sensed condition indicates that the current valve orientation matches the desired valve orientation includes comparing the sensed condition that corresponds to the current valve orientation to a predetermined sensed condition associated with the desired valve orientation.

In some embodiments, the sensor is a temperature sensor configured to detect a temperature measurement based on fluid flow through the conduit, and wherein the predetermined sensed condition is a temperature which changes with the orientation of the valve within the conduit.

In some embodiments, the operations of the system further includes, responsive to controlling the motor to selectively rotate the valve in the direction to move the valve towards the desired valve orientation, re-sensing a condition corresponding to the current valve orientation. The operations may further include determining whether the re-sensed condition indicates that the current valve orientation matches the desired valve orientation. Determining whether the re-sensed condition indicates that the current valve orientation matches the desired valve orientation wherein if the current valve orientation matches the desired valve orientation, the processor defines the current valve orientation as the desired valve orientation. If the current valve orientation does not match the desired valve orientation, the processor controls the motor to selectively rotate the valve in a direction to move the valve towards the desired valve orientation and repeat until the current valve orientation is the desired valve orientation.

In some embodiments, the valve includes a two-way valve that is configured to phase correct by 90 degrees upon being selectively rotated by the motor, or a three-way valve that is configured to phase correct by a multiple of 90 degrees upon being selectively rotated by the motor.

In some embodiments, the valve includes a six-way valve that is configured to phase correct by a multiple of 90 degrees upon being selectively rotated by the motor.

Another implementation of the present disclosure includes a method for controlling a valve. The method includes a step of positioning an actuator on the valve. The valve is positioned in a conduit. The valve is configured to change fluid flow through the conduit. The method includes a step of receiving a request for a desired valve orientation. The method further includes the step of controlling a motor of the actuator to move the valve into a desired valve orientation. The method further includes the step of sensing a condition based on an orientation of the valve within the conduit, wherein the sensed condition corresponds to a current valve orientation following movement by the motor. The method further includes the step of determining if the sensed condition indicates that the current valve orientation matches the desired valve orientation from the request. The method further includes the step of, responsive to determining that that current valve orientation does not match the desired valve orientation from the request, controlling the motor to selectively rotate the valve in a direction to move the valve towards the desired valve orientation.

In some embodiments, the step of responsive to determining that the current valve orientation does not match the desired valve orientation from the request further includes controlling the motor to selectively rotate the valve by a multiple of 90 degrees to phase correct to the desired valve orientation.

In some embodiments, the step of determining if the sensed condition indicates that the current valve orientation is the desired valve orientation further includes comparing the sensed condition corresponding to the current valve orientation to a predetermined sensed condition stored in a memory corresponding to the desired valve orientation.

In some embodiments, the sensed condition is sensed by a temperature sensor that is configured to detect the temperature measurement based on fluid flow through the conduit. The predetermined sensed condition is a temperature which changes with the orientation of the valve within the conduit.

In some embodiments, the method of controlling a valve further includes the step of, responsive to controlling the motor to selectively rotate the valve in the direction to move the valve towards the desired valve orientation, re-sensing a condition corresponding to the current valve orientation. The method further includes the step of determining whether the re-sensed condition indicates that the current valve orientation matches the desired valve orientation. If the current valve orientation matches the desired valve orientation, the processor defines the current valve orientation as the desired valve orientation. If the current valve orientation does not match the desired valve orientation, the processor controls the motor to selectively rotate the valve in a direction to move the valve towards the desired valve orientation and repeat until the current valve orientation is the desired valve orientation.

Another implementation of the present disclosure includes an actuator coupled to a valve. The actuator includes a motor configured to control an orientation of the valve within a conduit. The actuator further includes an actuator controller operatively connected to the controller and configured to selectively rotate the valve. The actuator controller including an actuator controller. The actuator controller including a processor and memory. The memory storing instructions that, when executed by the processor, cause the processor to receive a request for a desired valve orientation. The memory is further structured to cause the processor to control the motor to move the valve into the desired valve orientation. The memory is further structured to cause the processor to sense a condition corresponding to a current valve orientation following movement by the motor. The memory is further structured to cause the processor to determine if the sensed condition indicates that the current valve orientation matches the desired valve orientation from the request. The memory is further structured to cause the processor to, responsive to determining that the current valve orientation does not match the desired valve orientation from the request, controlling the motor to selectively rotate the valve in a direction to move the valve towards the desired valve orientation.

In some embodiments, responsive to determining that the current valve orientation does not match the desired valve orientation from the request, the actuator is further configured to control the motor to selectively rotate the valve by a multiple of 90 degrees to phase correct to the desired valve orientation to modulate fluid flow through the conduit.

In some embodiments, the actuator is configured determine if the sensed condition indicates that the current valve orientation matches the desired valve orientation by comparing the sensed condition that corresponds to the current valve orientation to a predetermined sensed condition stored in the memory that is associated with the desired valve orientation.

In some embodiments, the sensed condition is sensed by a temperature sensor configured to detect a temperature measurement based on fluid flow through the conduit, and the predetermined sensed condition is a temperature which changes with the orientation of the valve within the conduit.

In some embodiments, the sensed condition indicates the current valve orientation by indicating whether a respective flow through the conduit is open or closed.

In some embodiments, the processor determines the multiple of 90 degrees to control the motor to selectively rotate the valve to the desired valve orientation based on the current valve orientation.

In some embodiments, the processor is further configured to, responsive to controlling the motor to selectively rotate the valve in the direction to move the valve towards the desired valve orientation, re-sensing a condition corresponding to the current valve orientation. The processor is further configured to determine whether the re-sensed condition indicates that the current valve orientation matches the desired valve orientation. If the current valve orientation matches the desired valve orientation, the processor is further configured to define the current valve orientation as the desired valve orientation. If the current valve orientation does not match the desired valve orientation, the processor is further configured to control the motor to selectively rotate the valve in a direction to move the valve towards the desired valve orientation and repeat until the current valve orientation is the desired valve orientation.

In some embodiments, the valve includes a six-way valve that is configured to phase correct by a multiple of 90 degrees upon being selectively rotated by the motor.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 10 is an example of a conduit having a two-way valve, where the valve is oriented in a first (closed) desired orientation, according to an exemplary embodiment.

FIG. 11 is an example of a conduit having a two-way valve, where the valve is oriented in a second (open) desired orientation, according to an exemplary embodiment.

FIG. 12 is an example of a conduit having a three-way valve, where the valve is oriented in a first (coil closed, full bypass) desired orientation, according to an exemplary embodiment.

FIG. 13 is an example of a conduit having a three-way valve, where the valve is oriented in a second (coil open, bypass closed) desired orientation, according to an exemplary embodiment.

FIG. 14 is an example of a conduit having a two-way valve, where the valve is installed in an orientation that does not match the first desired orientation, according to an exemplary embodiment.

FIG. 15 is an example of a conduit having a two-way valve, where the valve of FIG. 14 is phase corrected so that the current orientation is rotated to match the desired orientation, according to an exemplary embodiment.

FIG. 16 is an example of a conduit having a three-way valve, where the valve is installed in an orientation that does not match the first desired orientation, according to an exemplary embodiment.

FIG. 17 is an example of a conduit having a three-way valve, where the valve of FIG. 16 is phase corrected so that the current orientation is rotated to match the desired orientation, according to an exemplary embodiment.

DETAILED DESCRIPTION

Referring generally to the FIGURES, systems and methods for controlling fluid flow through a conduit using a 360 degree smart repositioning valve actuator are shown, according to an exemplary embodiment. The systems and methods may control fluid flow through, for example, a two-way or three-way valve positioned in a conduit, by controlling the valve orientation using a motor. The fluid flow that is controlled may be, for example, a supply line and a return line within an HVAC or other system. The system may be configured to determine the valve orientation based on a sensed condition, such as a temperature measurement of fluid flow through the conduit. If a current valve orientation does not match a desired valve orientation based on the sensed condition, the motor may be configured to move the valve in a direction toward the desired valve orientation.

The aspects described herein may increase the accuracy and efficiency of the operation of valve actuators. For instance, as a result of the aspects described herein, in the event that an actuator is installed incorrectly onto a conduit having a valve, rather than requiring an operator to manually reposition the actuator to troubleshoot the orientation of the valve, the valve actuator may instead be configured to determine the current valve orientation and self-correct to a desired valve orientation. This reduces the labor required to troubleshoot and correct any improper installation of the actuator. In addition, because of the often compact designs where such actuators may be installed, an operator has the ability to install the actuator in any orientation in which the actuator may fit, without worrying about the valve orientation.

Building Management System and HVAC System

Figure 1:
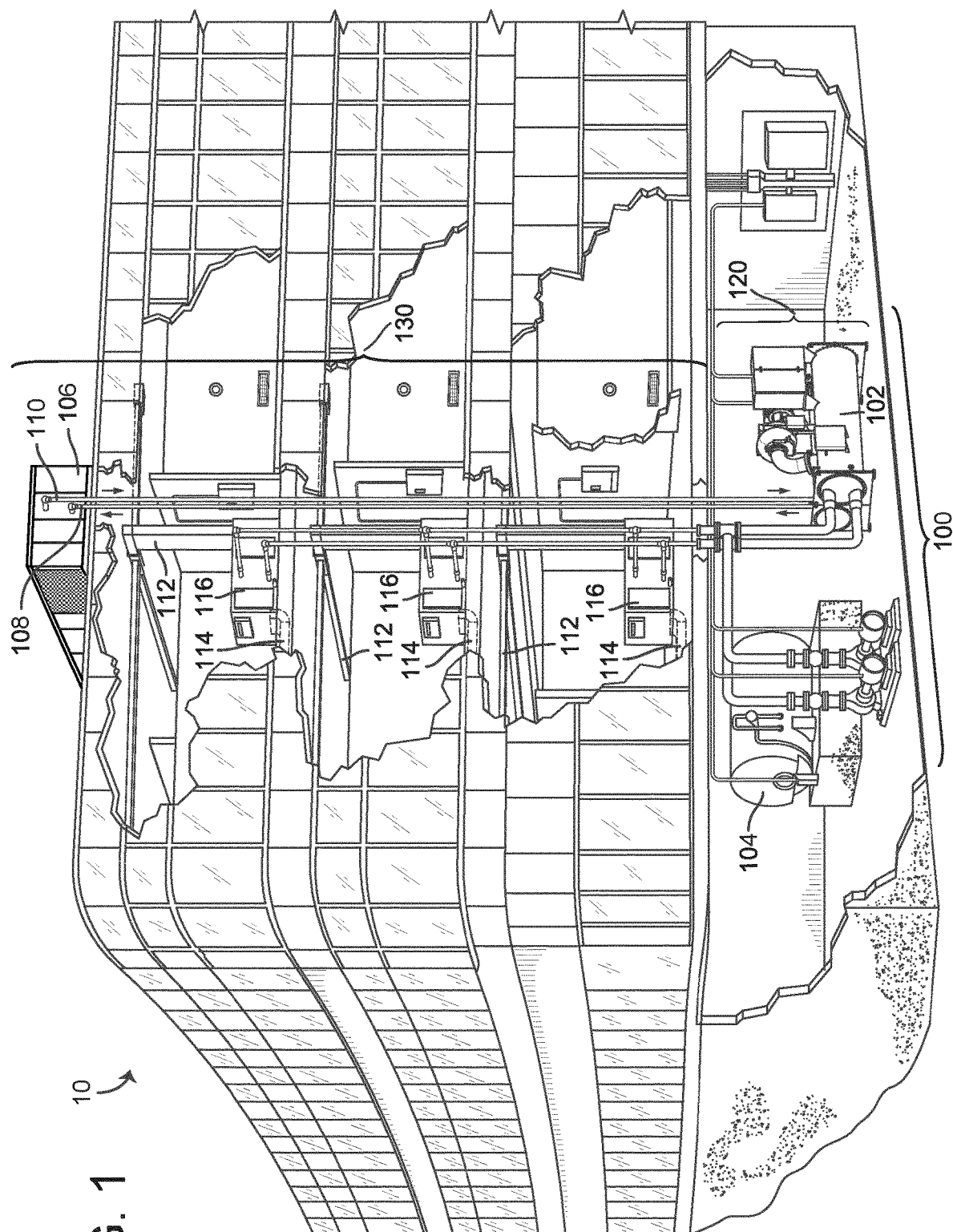
FIG. 1 is a drawing of a building equipped with a heating, ventilating, or air conditioning (HVAC) system and a building management system (BMS), according to an exemplary embodiment.

Referring now to FIGS. 1-4, an exemplary building management system (BMS) and HVAC system in which the systems and methods of the present disclosure may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS may include, for example, an HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid.

The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that may be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve set point conditions for the building zone.

Figure 2:
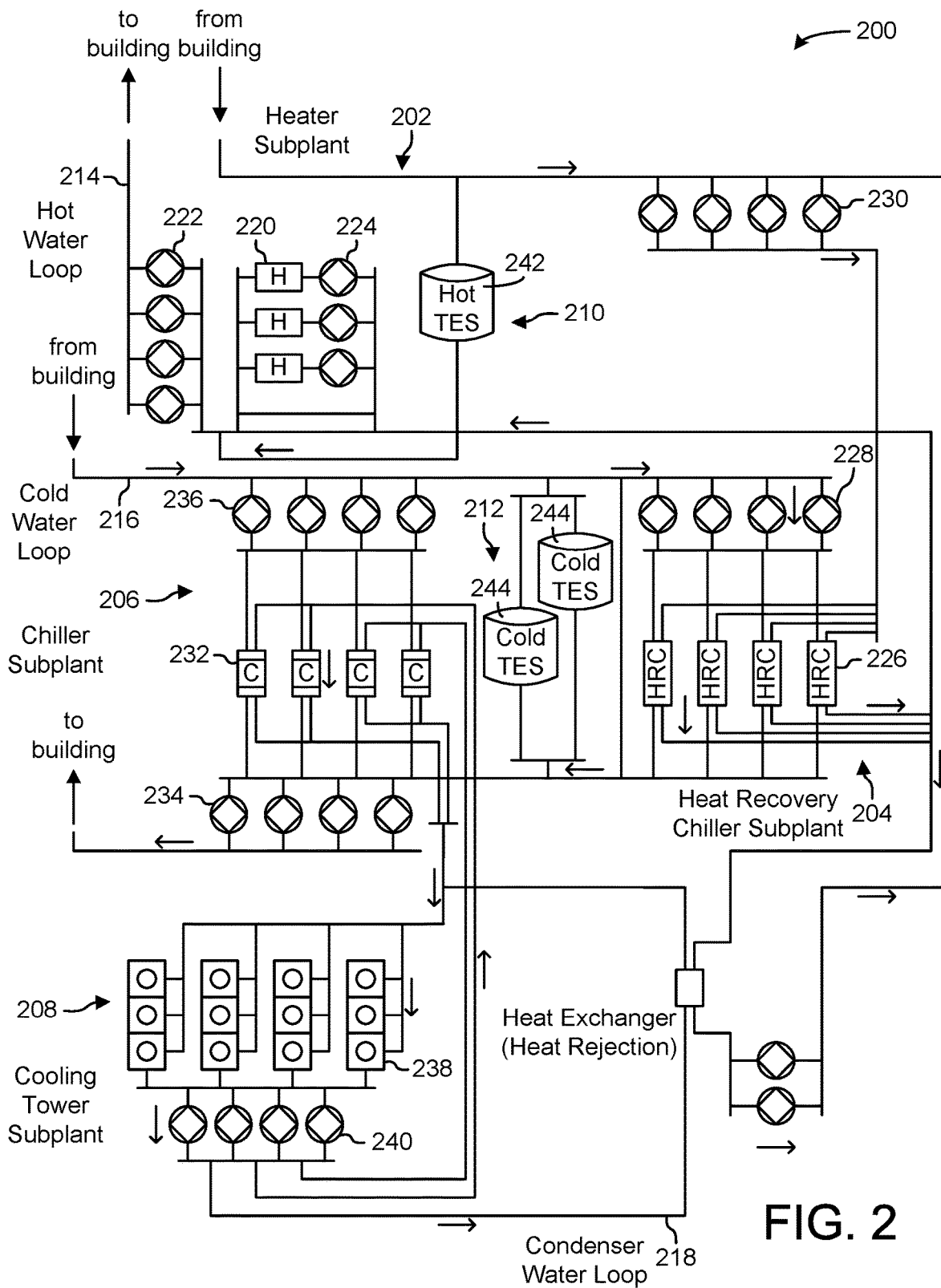
FIG. 2 is a schematic diagram of a waterside system which may be used to support the HVAC system of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
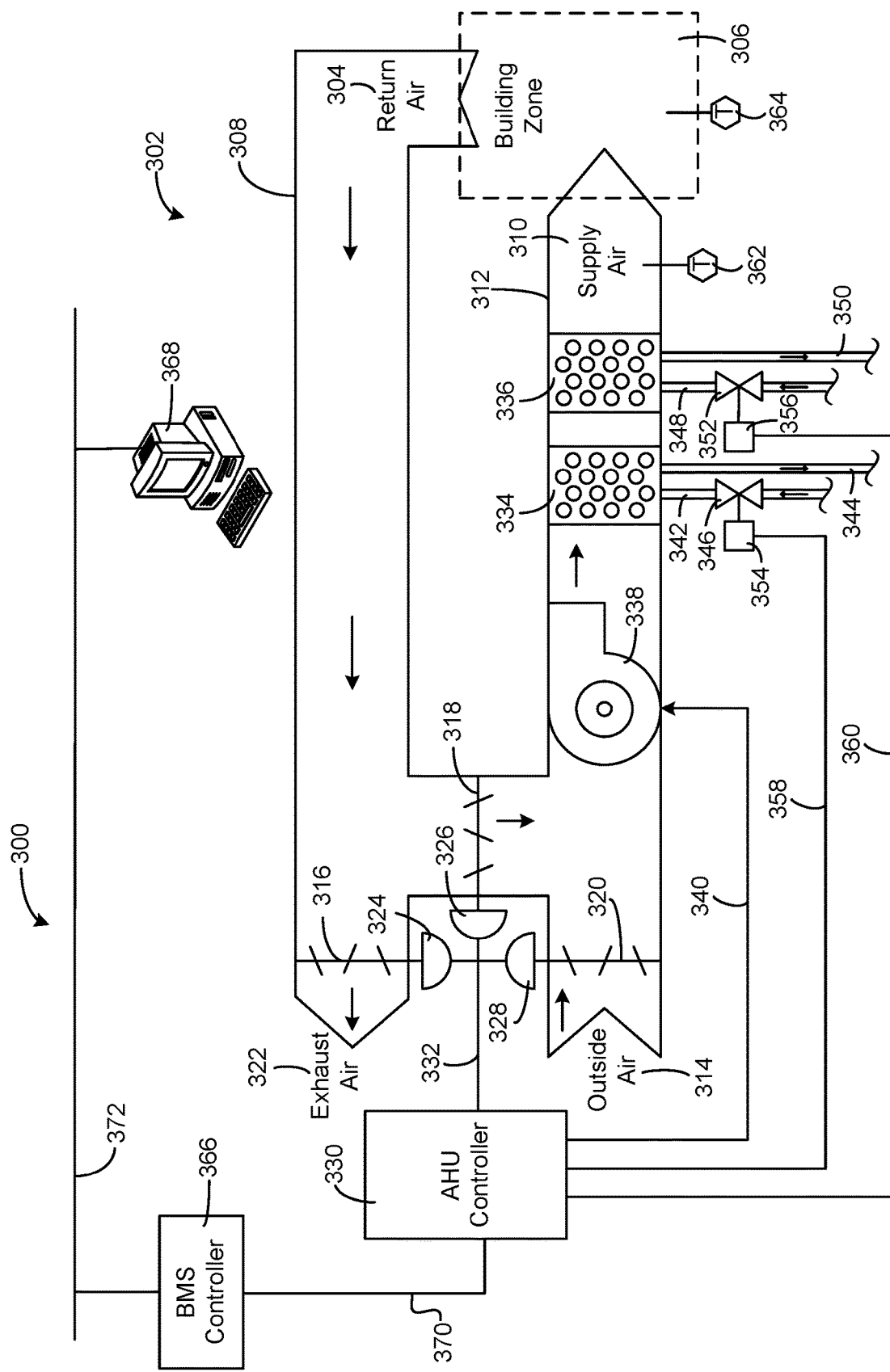
FIG. 3 is a block diagram of an airside system which may be used as part of the HVAC system of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type AHU 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that may be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that may be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a BMS controller 366 and a client device 368. BMS controller 366 may include one or more computer systems (e.g., servers, supervisory controllers, subsystem controllers, etc.) that serve as system-level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that may be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
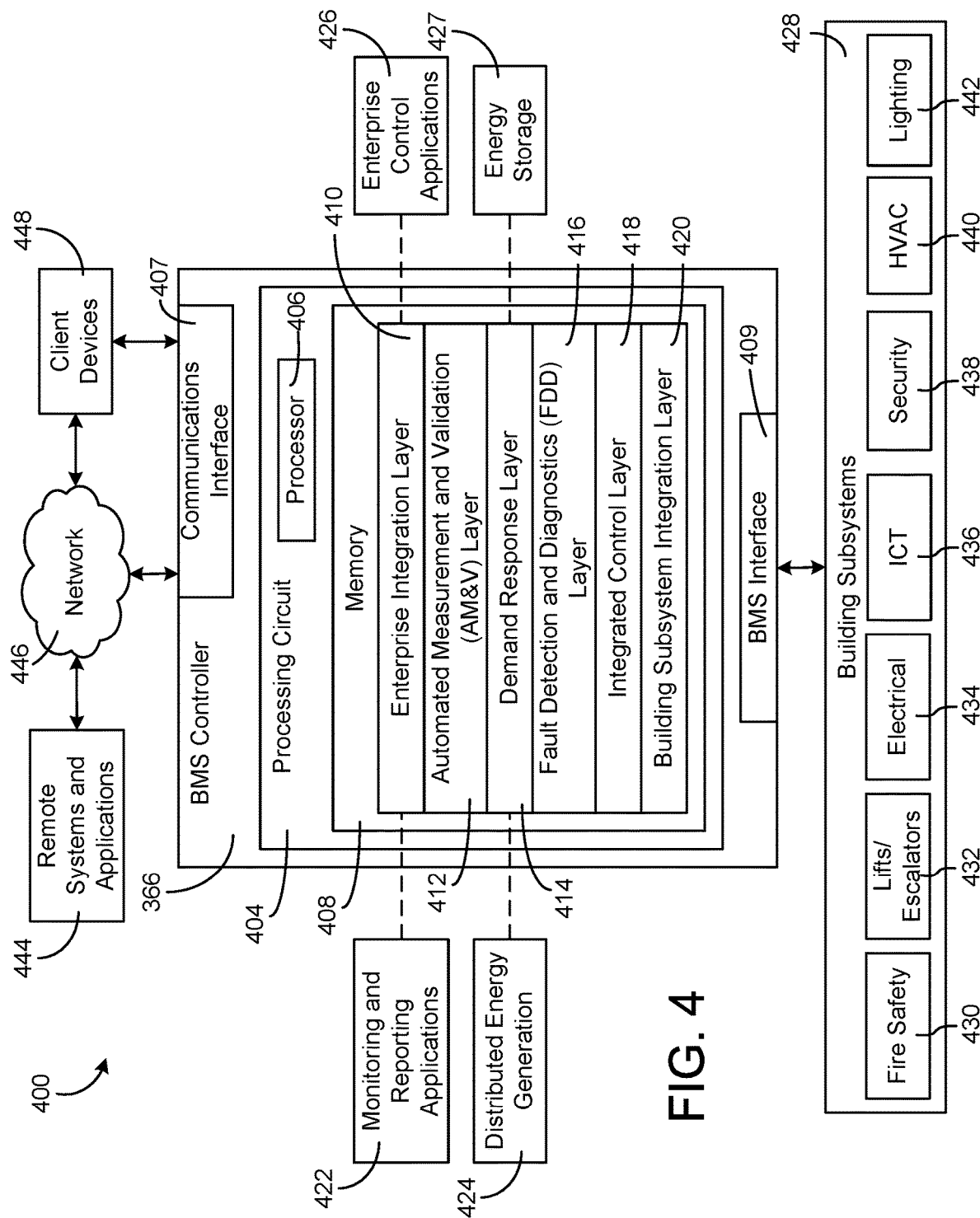
FIG. 4 is a block diagram of a BMS which may be implemented in the building of FIG. 1, according to an exemplary embodiment.

Referring now to FIG. 4, a block diagram of a BMS 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, an HVAC subsystem 440, a lighting subsystem 442, a lift/escalators subsystem 432, and a fire safety subsystem 430. In various embodiments, building subsystems 428 may include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include any number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407 and 409 may be or may include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407 and 409 may be direct (e.g., local wired or wireless communications) or via a communications network 446 (e.g., a WAN, the Internet, a cellular network, etc.). For example, interfaces 407 and 409 may include an Ethernet card and port for sending and receiving data via an Ethernet-based communications link or network. In another example, interfaces 407 and 409 may include a WiFi transceiver for communicating via a wireless communications network. In another example, one or both of interfaces 407 and 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof may send and receive data via interfaces 407 and 409. Processor 406 may be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers, and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments, BMS controller 366 may be distributed across multiple servers or computers (e.g., that may exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 may work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translates communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses may include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions may specify which equipment may be turned on or off in response to particular demand inputs, how long a system or piece of equipment should be turned off, what setpoints may be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Valve Repositioning System

Figure 5:
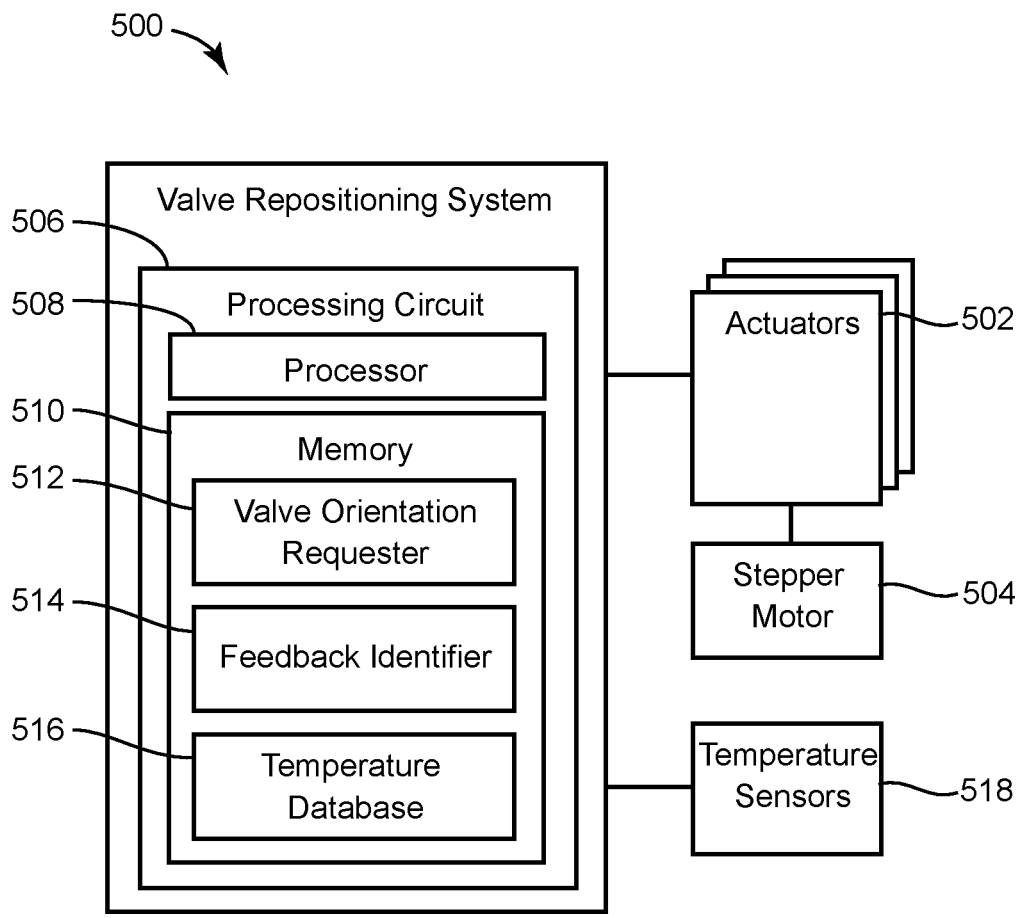
FIG. 5 is an example schematic diagram of an actuator controller which may be used to control the orientation of a valve, according to an exemplary embodiment.

Referring now to FIG. 5, a schematic diagram of a valve repositioning system 500 configured to control fluid flow through a conduit is shown, according to an exemplary embodiment. The valve repositioning system 500 includes actuators 502 for use in an HVAC or other system/subsystem described above, according to various exemplary embodiments. In some implementations, actuator 502 may be used in HVAC system 100, waterside system 200, airside system 300, or BMS 400, as described with reference to FIGS. 1-4. For example, actuator 502 may be a damper actuator, a valve actuator, a fan actuator, a pump actuator, or any other type of actuator that may be used in an HVAC system or BMS. In various embodiments, actuator 502 may be a linear actuator (e.g., a linear proportional actuator), a non-linear actuator, a spring return actuator, or a non-spring return actuator.

The actuator 502 includes a motor 504. Motor 504 is configured to move a valve from a current valve orientation towards a desired valve orientation within a conduit. In some embodiments, motor 504 may rotate the valve in predetermined steps. In such embodiments, motor 504 may be a stepper motor (though, in other various embodiments, the actuator 502 may include other types of motors). For instance, a full rotation of a rotor for the motor 504 may be divided into a number of steps. From an initial position, motor 504 may rotate in the predetermined steps towards a full rotation. Where the motor 504 rotates the full number of steps, the motor 504 will have completed a full rotation. Such embodiments permit precise movement and control of motor 504. In addition, the motor 504 may rotate the valve by increments of, for example, 90 degrees. In some embodiments, the motor 504 may be configured to rotate the valve in increments of, for example, 15 degrees. In this way, it should be appreciated that the motor 504 may be configured to move the valve by any predetermined increment.

Valve repositioning system 500 is shown to include an actuator controller 506. Actuator controller 506 may be located on-board actuator 502 (i.e., actuator controller 506 is contained within a housing for actuator 502). In other implementations, one or more of the components of actuator controller 506 may be located external from actuator 502. For instance, actuator controller 506 may be a component of BMS controller 366.

The actuator controller 506 may include a processor 508 and memory 510. In some embodiments, the actuator controller 506 may be an element or of incorporated into processing circuit 404. In these embodiments, processor 508 and memory 510 may be the same as (or a part of) processor 406 and memory 408, respectively. In still other embodiments, portions of the actuator controller 506 may be located remote from actuator 502 (for instance, processor 508 may be a part of processor 406, or memory 510 may be a part of memory 408, etc.).

The processor 508 may be implemented as a general purpose processor, an ASIC, one or more FPGAs, a group of processing components, or other suitable electronic processing components. Additionally, memory 510 (e.g., memory, memory unit, storage device, etc.) may include one or more devices (e.g., RAM, ROM, Flash memory, hard disk storage, etc.) for storing data and/or computer code for completing or facilitating the various processes, layers, and modules described in the present application. Memory 510 may be or include volatile memory or non-volatile memory. Memory 510 may include database components, object code components, script components, or any other type of information structure for supporting the various activities and information structures described in the present application. According to an exemplary embodiment, memory 510 is communicably connected to processor 508 via actuator controller 506 and includes computer code for executing (e.g., by actuator controller 506 and/or processor) one or more processes described herein.

Memory 510 is shown to include various circuits. Each of these circuits may be embodied on memory 510 and structured to cause the processor 508 to execute various functions described herein. While shown as separate from one another, one or more of these circuits may be combined with another circuit. Further, some circuits may be divided into one or more additional circuits.

Memory 510 is shown to include a valve orientation requester 512. The valve orientation requester 512 may be or include various circuitry that causes the processor 508 to generate signals for driving motor 504. The valve orientation requester 512 may be operatively connected to processor 508 and motor 504. In some embodiments, valve orientation requester 512 may receive one or more signals (e.g., from processor 508), and provide those signals to the motor 504 to cause the motor 504 to rotate. In some embodiments, the signal provided to the motor 504 may be a pulsed signal (such as a pulse width modulated (PWM) signal). Each pulse in a given signal causes motor 504 to rotate a step. The processor 508 may receive inputs from, for instance, one or more external sources. For instance, actuator 502 may include a communications device. In some embodiments, the communications device may be a near-field communications (NFC) device. The NFC device may be communicably coupled to and provide commands to the processor 508. In other embodiments, the processor 508 may receive inputs from other external sources, such as other processors/communications devices located within the HVAC system/BMS system.

The memory 510 is shown to include a feedback identifier 514. The feedback identifier 514 may be configured to, for example, determine if a sensed condition indicates that a current valve orientation matches a desired valve orientation from a request send by the valve orientation requester 512.

Memory 510 is shown to further include a temperature database 516. The temperature database 516 may include predetermined temperature measurements that are associated with certain valve orientations. However, it should be appreciated that memory 510 could alternatively or additionally include any sensed condition database which tends to correspond with a valve orientation such as pressure, flow rates, and so forth.

The valve repositioning system 500 is shown to further include temperature sensors 518. The temperature sensors 518 may be used to detect a temperature of the conduit to infer the temperature or existence of fluid flow through a conduit. However, it should be appreciated that while temperature sensors 518 are shown, valve repositioning system 500 may alternatively or additionally include any sensor for detecting any sensed condition.

The inputs received by the processor 508 may cause the processor 508 to drive the motor 504. For instance, one of the inputs may be an input directing the processor 508 to move a valve being controlled by the motor 504 from a closed position to an open position. Such position may be defined by a full rotation of the motor 504. The valve orientation requester 512 may generate one or more signals that cause the motor 504 to rotate a number of full steps for a full rotation.

Figure 6:
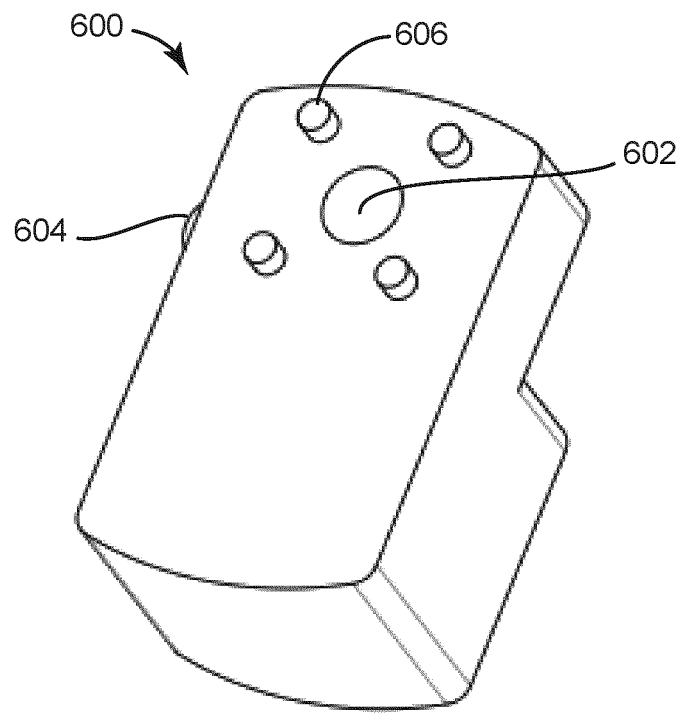
FIG. 6 is an example of an actuator used to control the orientation of a valve, according to an exemplary embodiment.
Figure 7A:
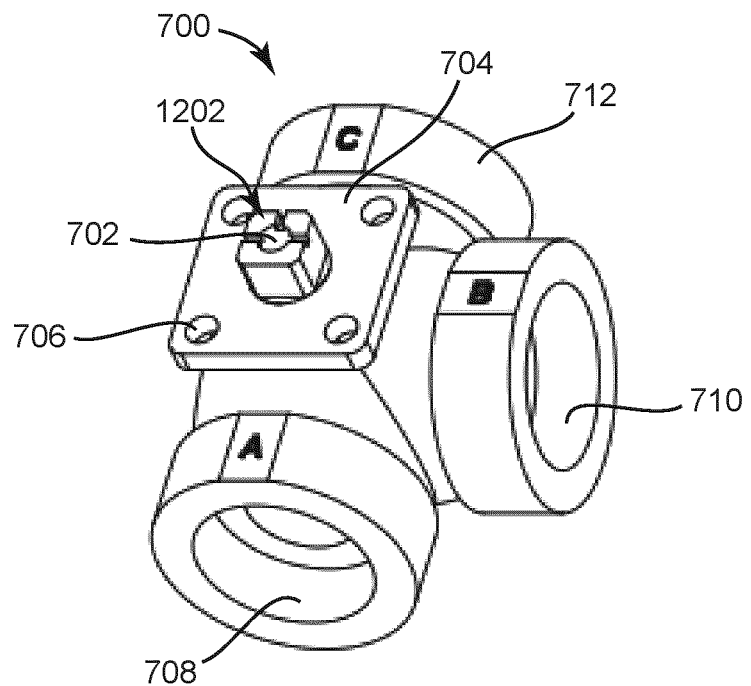
FIG. 7A is an example of a conduit having a three-way valve that is controlled by the actuator of FIG. 6, according to an exemplary embodiment.
Figure 7B:
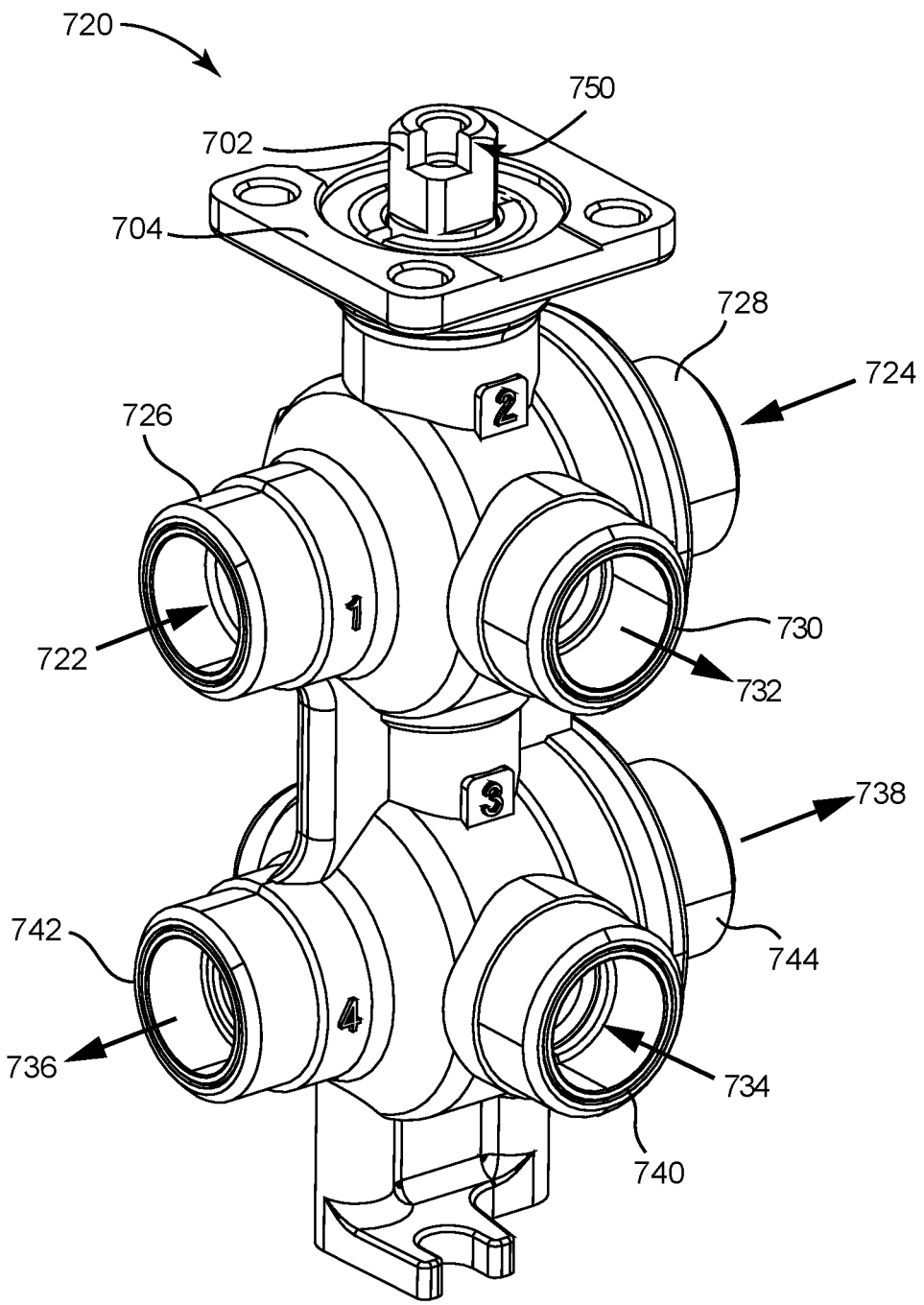
FIG. 7B is an example of a conduit having a six-way valve that is configured to simultaneously switch between two fluid supplies and two fluid returns by rotating a single valve member, according to an exemplary embodiment.

Referring now to FIGS. 6-7B, perspective views of an actuator 600 and conduits are shown, according to an exemplary embodiment. Specifically, FIG. 7A depicts a perspective drawing of a conduit 700 configured to receive a three-way valve member therein, and FIG. 7B depicts a conduit 720 configured to receive a six-way valve member therein. Referring to FIG. 6, actuator 600 is shown to include a back surface having a throughgoing bore 602 and a plurality of posts 606. Specifically, the posts 606 are shown to be positioned in a square configuration (i.e., equidistant). The posts 606 may be configured to both operatively couple the actuator 600 to the conduit 700, and to transmit a signal to the receivers 706 of the conduit 700. It should be appreciated that, since the posts 606 are configured in a symmetrical manner, the actuator 600 may be installed in any of four positions at 90 degree intervals. The actuator 600 further includes a position selector 604 on a front surface. The position selector 604 may be configured to concentrically align with the throughgoing bore 602 of the actuator 600. When the actuator 600 is properly installed onto the conduit 700, the position selector 604 is configured such that the orientation of the position selector 604 is representative of the flow of fluid through the conduit 700. In this way, the position selector 604 may provide a visual indication to a user as to the status of the system (i.e., if the system is open or closed). In addition, while the actuator 600 is described with reference to conduit 700 of FIG. 7A, it should be appreciated that the actuator 600 may interact with conduit 720 of FIG. 7B, or conduit 802 of FIG. 8 in a substantially similar manner.

Referring now to FIG. 7A, a perspective view of a conduit 700 configured to receive a three-way valve member 1202 therein is shown. The conduit 700 is shown to include a body having a mounting surface 704 and a plurality of ports 708, 710, 712. The conduit 700 includes an input port 708, a bypass port 710, and an output port 712 positioned opposite to the input port 708. The mounting surface 704 is configured to operatively couple to the back surface of the actuator 600. In addition, the mounting surface 704 is shown to enclose a cavity (i.e., valve chamber) within a top surface of the conduit 700.

The three-way valve member 1202 within conduit 720 may be used to switch between a coil return and a fluid supply. For example, conduit 720 may be configured to receive coil return (e.g., coil return line 908) at input port 708 and to receive a bypass (e.g., first fluid supply line 902) at bypass port 710. As shown, input port 708 and output port 712 may be inline ports (e.g., aligned with a common axis) and may be located on opposite sides of the valve chamber. Bypass port 710 may be a traverse port (e.g., not inline with ports 708 and 712). As shown, bypass port 710 is in the same plane as, but substantially perpendicular to ports 708 and 712. In other embodiments, bypass port 710 may be oriented at a variety of different angles relative to ports 708 and 712 and may not be in the same plane as ports 708 and 712. Outlet port 712 may connect to a fan coil unit (e.g., via a coil supply line).

In various embodiments, the plurality of ports 708-712 may include any number of ports (e.g., two ports, three ports, four ports, six ports, etc.). Ports 708-712 may be configured to connect to pipes, tubes, or other fluid control components. Ports 708-712 may be configured to connect with fluid pipelines using threadings, compression fittings, glue, cement, flanges, welding, or other fasteners.

Still referring to FIG. 7A, conduit 700 is shown to receive three-way valve member 1202. Valve member 1202 may include a ball member and a valve stem 702, and may be rotated to selectively control fluid flow from either coil return line 908 or bypass line 902 to outlet port 712 (e.g., without mixing). The ball member may be substantially spherical. The substantially spherical ball member may result in valve member 1202 being characterized as a ball valve. In various embodiments, the ball member may be fixedly attached to the valve stem 702 or combined with the valve stem into a single component. The valve stem may extend through the conduit 700 and connect to a handle (e.g., position selector 604) or actuator (e.g., actuator 600) for controlling the rotation of the ball member.

The ball member may include a plurality of passages that permits fluid to flow through the ball member. In some embodiments, the configuration of the plurality of passages is L-shaped (e.g., having two openings and a single 90-degree bend). In other embodiments, the configuration of the plurality of passages may be T-shaped (e.g., having a main bore straight through the ball member and a second bore extending perpendicularly from one side of the main bore). In other embodiments, the configuration of the plurality of passages may be linear (e.g., extending along a single axis), X-shaped (e.g., having two bores extending through the ball member and intersecting as a 90-degree angle) or having any other shape. The passage through the ball member may be controllably aligned (e.g., partially aligned, fully aligned, etc.) with ports 708-712 to form a fluid connection between pairs of ports. For example, the passage may be rotated into alignment with either input port 708 and bypass port 710, bypass port 710 and output port 712, or input port 708 and output port 712. In addition, the system may be open, such that plurality of passages may align with the input port 708, bypass port 710, and output port 712.

Valve member 1202 includes a plurality of passages which, in some embodiments, align with the ports 708, 710, 712 of the conduit 700. Specifically, the configuration of the plurality of passages of valve member 1202 is T-shaped. All ports 708-712 of the conduit 700 are in fluid communication within the valve member 1202 and one another. In addition, the ports 708, 710, 712 are configured to selectively engage with the passages 1204, 1206, 1208 of valve member 1202, respectively In operation, valve member 1202 may be located at least partially within the internal valve chamber of conduit 700. Valve member 1202 may be controllably movable (e.g., in rotation, in linear movement, etc.) relative to conduit 700 to modulate fluid flow through the conduit 700. By rotating valve member 1202 relative to conduit 700, fluid flow can be selectively controlled (e.g., diverted, adjusted, increased, decreased, etc.) between the plurality of ports 708-712.

The valve member 1202 includes a valve stem 702 which extends upward through a bore in the mounting surface 704 of the conduit 700. The mounting surface 704 is shown to include four receivers 706 which are spaced to correspond to the posts 606 on the actuator 600. In this way, when the actuator 600 and conduit 700 are coupled to one another, the posts 606 may be configured to be received within the receivers 706 of the conduit 700, while the valve stem 702 is received within the throughgoing bore 602 of the actuator 600. In addition, in some embodiments, the perimeter of the valve stem 702 may engage with an internal surface of the position selector 604, so as to allow the valve stem 702 and position selector 604 to rotate together.

Referring now to FIG. 7B, a conduit 720 configured to receive a six-way valve member 750 is shown. In effect, the conduit 720 may be comprised of two conduits 700 in a stacked orientation, where the cavity of each conduit 700 is in fluid communication with one another. In the stacked orientation, the single valve member 750 can be used to control fluid flow through both of the three-way conduits 700. Advantageously, six-way valve members 750 may be controlled by a single actuator 600 acting upon the valve member 750.

The six-way valve member 750 of conduit 720 may be used to switch between two fluid supplies and two fluid returns. For example, conduit 720 may be configured to receive first fluid supply 722 at first fluid supply port 726 and to receive second fluid supply 724 at second supply port 728. As shown, first port 726 and second port 728 may be inline ports (e.g., aligned with a common axis) and may be located on opposite sides of the valve chamber. Valve member 750 may include a ball member and a valve stem and may be rotated to selectively control fluid flow from either first supply port 726 or second supply port 728 to outlet port 730 (e.g., without mixing). As such, conduit 720 may be useable with a four-pipe system to enable selective delivery of hot and cold fluid to a fluid circuit. For example, cold fluid supply and return lines may be connected to ports 726 and 742, hot fluid supply and return lines may be connected to ports 724 and 744, and the fluid circuit may be connected to ports 730 and 740.

Outlet port 730 may be a transverse port (e.g., not inline with ports 726 and 728). As shown, outlet port 730 is substantially perpendicular to ports 726 and 728 and in the same plane as ports 726 and 728. In other embodiments, outlet port 730 may be oriented at a variety of different angles relative to ports 726 and 728 and may not be in the same plane as ports 726 and 728. Outlet port 730 may connect to a fan coil unit (e.g., via a coil supply line). The fluid from outlet port 730 may pass through a fan coil unit and return to conduit 720 at return port 740. Valve member 750 may be rotated to selectively divert fluid from return port 740 to either first return port 742 or second return port 744. Return ports 742 and 744 may be fluidly connected to returns 736 and 738, respectively.

In various embodiments, the plurality of ports 726-744 may include any number of ports (e.g., two ports, three ports, four ports, six ports, etc.). Ports 726-744 may be configured to connect to pipes, tubes, or other fluid control components. Ports 726-744 may be configured to connect with fluid pipelines using threadings, compression fittings, glue, cement, flanges, welding, or other fasteners.

Still referring to FIG. 7B, conduit 720 is shown to receive valve member 750. Valve member 750 may include a ball member and a valve stem 702. The ball member may be substantially spherical. The substantially spherical ball member may result in valve member 750 being characterized as a ball valve. In various embodiments, the ball member may be fixedly attached to the valve stem 702 or combined with the valve stem 702 into a single component. The valve stem 702 may extend through the conduit 720 and connect to a handle (e.g., position selector 604) or actuator (e.g., actuator 600) for controlling the rotation of the ball member.

In operation, valve member 750 may be located at least partially within the internal valve chamber. Valve member 750 may be controllably movable (e.g., in rotation, in linear movement, etc.) relative to conduit 720 to modulate fluid flow through the conduit 720. By rotating valve member 750 relative to conduit 720, fluid flow can be selectively controlled (e.g., diverted, adjusted, increased, decreased, etc.) between the plurality of ports 726-744.

The ball member may include a passage that permits fluid to flow through the ball member. In some embodiments, the passage is L-shaped (e.g., having two openings and a single 90-degree bend). In other embodiments, the passage may be T-shaped (e.g., having a main bore straight through the ball member and a second bore extending perpendicularly from one side of the main bore, may be linear (e.g., extending along a single axis), X-shaped (e.g., having two bores extending through the ball member and intersecting as a 90-degree angle) or having any other shape.

The passage through the ball member may be controllably aligned (e.g., partially aligned, fully aligned, etc.) with ports 726-744 to form a fluid connection between pairs of ports. For example, the passage may be rotated into alignment with either first port 726 and third port 730, or second port 728 and third port 730. Under the six-way valve configuration of conduit 720, the passage may additional be rotated into alignment with either return port 740 and first return port 742, or return port 740 and second return port 744.

Fluid Systems

Figure 8:
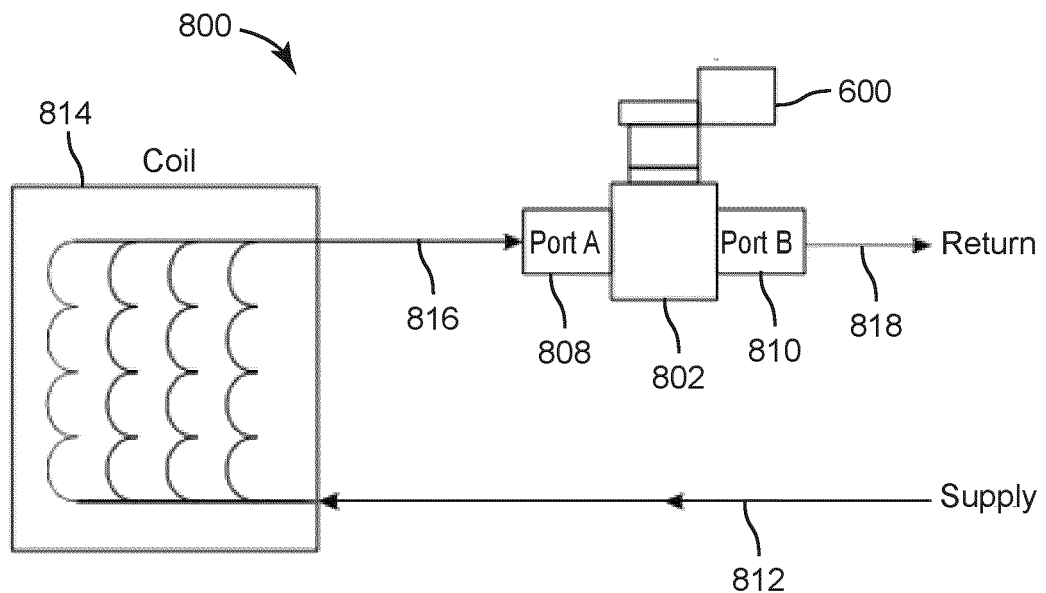
FIG. 8 is a schematic diagram showing the flow of fluid through a conduit having a two-way valve, according to an exemplary embodiment.
Figure 9:
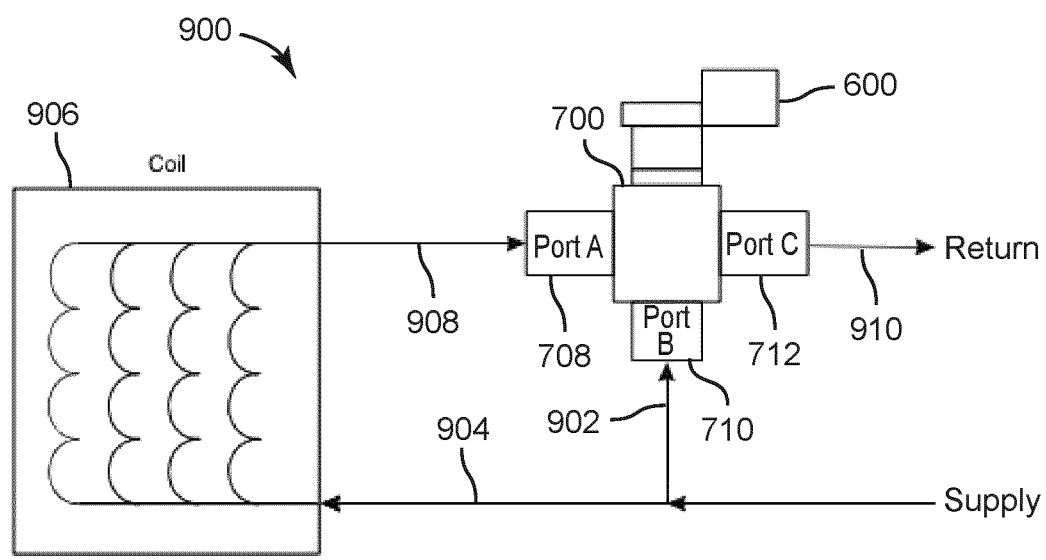
FIG. 9 is a schematic diagram showing the flow of fluid through a conduit having a three-way valve, according to an exemplary embodiment.

Referring now to FIGS. 8-9, fluid systems 800, 900 are shown, according to an exemplary embodiment. Each system 800, 900 includes a conduit having a valve member received therein. While the valve members are not shown in FIGS. 8-9, it should be appreciated that the valve members are configured to modulate the fluid flow through the respective conduit. Referring specifically to FIG. 8, a fluid system 800 is shown to include a fluid supply 812. In some embodiments, fluid supply 812 may be water, or various fluids other than water (e.g., various types of gases, liquids, fluidized solids, slurries, etc.). The fluid supply line 812 is shown connecting to a coil 814. The coil 814 may intake fluid from the fluid supply line 812 and output fluid to a coil return line 816.

The coil return line 816 is shown connecting to a fluid control valve that is disposed in a conduit 802. Specifically, the coil return line 816 is shown connecting to an input port 808 of a conduit 802 having a two-way valve member 1002 received therein (see, for example, FIGS. 10-11). In this way, the fluid may enter the conduit 802 through an input port 808, and selectively pass through the output port 810 that is positioned opposite from the input port 808. The output port 810 is shown to connect to a fluid return line 818.

The conduit 802 is shown to include an actuator 600 coupled thereto. The actuator 600 may be rotatably coupled to the valve member 1002 and configured to rotate the valve member 1002 by a multiple of 90 degrees to control the fluid flow through the conduit 802. For example, the actuator 600 may control the motor 504 to rotate the valve member 1002 by a multiple of 90 degrees to either open or close the circuit. The actuator 600 may be an electronic actuator configured to operate to valve in response to a control signal received from the actuator controller 506 of the valve repositioning system 500.

Referring now to FIG. 9, fluid system 900 is configured generally the same as fluid system 800 of FIG. 8, except a conduit 700 configured to receive a three-way valve member 1202 is shown (see, for example, FIGS. 12-13). Accordingly, fluid system 900 is shown to include a first fluid supply line 902 and a second fluid supply line 904. In some embodiments, the first fluid supply 902 and the second fluid supply 904 may be hot or cold water. In other embodiments, the first fluid supply 902 and the second fluid supply 904 may be various fluids other than water (e.g., various types of gases, liquids, fluidized solids, slurries, etc.).

The first fluid supply 902 is shown connecting to the conduit 700. Specifically, the first fluid supply line 902 is shown connected to a bypass port 710 of the conduit 700. The second fluid supply 904 is shown connecting to a coil 906. The coil 906 may intake fluid from the second fluid supply 904 and output fluid to a coil return line 908.

The coil return line 908 is shown connecting to the conduit 700. Specifically, the coil return line 908 is shown connecting to an input port 708 of the conduit 700. In this way, fluid may enter the conduit 700 from a coil return line 908 through a first input port 708, or from a first fluid supply line 902 through a second input port (e.g., bypass port) 710. In addition, the conduit 700 also includes an output port 712 positioned opposite from the first input port 708. The output port 712 is shown to connect to a fluid return line 910. In this way, the fluid system 900 of FIG. 9 is not configured to stop flow, like the fluid system 800 of FIG. 8, but instead manages flow through the system. As the valve member 1202 rotates, fluid flow remains constant through the supply side (i.e., fluid flow from either the input port 708 or the bypass port 710). Thus, the valve member 1202 modulates between fluid passing through the coil 906 and fluid passing through the bypass (i.e., first supply line 902).

The conduit 700 is shown to include an actuator 600 coupled thereto. The actuator 600 may be rotatably coupled to the valve member # and configured to rotate the valve member # by a multiple of 90 degrees to control the fluid flow through the conduit 700. For example, the actuator 600 may control the motor 504 to rotate the valve member # by a multiple of 90 degrees to either open or close various ports of the circuit. However, it should be appreciated that the motor 504 may rotate the valve member # by any other amount.

Actuator Installation and Detection

Referring now to FIG. 10, an example of a conduit 802 having a two-way valve member 1002 is shown in a first orientation. Specifically, the valve orientation shown depicts a closed circuit condition, where fluid entering the input port 808 is prohibited from exiting through the output port 810 of the conduit 802. As shown, in the first orientation of the two-way valve, the orientation of the valve stem 702 corresponds with both the orientation of the two-way valve member 1002 (see FIG. 10) within the conduit 802, and the orientation of the position selector 604 of the actuator 600. When in the first orientation, the opposing passages 1004, 1006 of the valve member 1002 are oriented perpendicular to the input port 808 and output port 810 of the conduit 802, resulting in the circuit being closed.

Referring now to FIG. 11, an example of a conduit 802 having a two-way valve member 1002 is shown in a second orientation. Specifically, the valve orientation shown depicts an open circuit condition, where fluid that enters from the input port 808 may freely pass through the conduit 802 and exit through the output port 810. In the second orientation of the two-way valve, the orientation of the valve stem 702 corresponds with both the orientation of the two-way valve member 1002 within the conduit 802, and the orientation of the position selector 604 of the actuator 600. When in the second orientation, the opposing passages 1004, 1006 of the valve member 1002 are oriented to align concentrically with the input port 808 and output port 810 of the conduit, resulting in the circuit being open.

It should be noted that generally, when the actuator 600 is properly installed onto the conduit 802, the orientation of the position selector 604 is representative of the flow of fluid through the valve member 1002. In other words, because the orientation of the valve stem 702, valve member 1002, and position selector 604 align in each respective orientation, a user may easily determine that the valve member 1002 is oriented correctly within the conduit 802 based on a sensed condition. For example, if a user installs the actuator 600 as shown in FIG. 10 onto the valve, and notices that the valve stem 702 and the position selector 604 are oriented in the same manner, and that there is no fluid flow through the conduit, the user may determine that the valve is in a first, closed circuit condition. The user may then rotate the position selector 604 counter clockwise by 90 degrees, such that the valve member 1002 will align with the input port 808 and output port 810 and allow fluid flow through the open circuit. That is, such that the current valve orientation matches the desired valve orientation (e.g., open circuit condition).

Referring now to FIG. 12, an example of a conduit 700 having a three-way valve is shown in a first orientation. Specifically, the valve orientation shown depicts a coil closed, full bypass condition, where fluid entering the input port 708 is prohibited from exiting through the output port 712 or the bypass port 710 of the conduit 700. As shown, in the first orientation of the three-way valve, the orientation of the valve stem 702 corresponds with the orientation of the three-way valve member 1202 within the conduit 700. The position selector 604 is shown to be oriented in a horizontal manner facing the right side of the actuator 600. When in the first orientation, the valve member 1202 is essentially rotated 90 degrees counterclockwise from the corresponding conduit 700 orientation. For example, a first passage 1204 which engages with the input port 708 is instead rotated 90 degrees counterclockwise, such that the first passage 1204 engages with the bypass port 710 while the second passage 1206 engages with the output port 712. When in this orientation, fluid flowing from the second supply 902 is permitted to pass through the conduit and exit through the output port 712, while the coil 906 is closed.

Referring now to FIG. 13, an example of a conduit having a three-way valve is shown in a second orientation. Specifically, the valve orientation shown depicts an open coil, bypass closed condition, where fluid entering from the input port 708 may freely pass through the conduit and exit through the output port 712. In the second orientation of the three-way valve, the orientation of the valve stem 702 corresponds with the orientation of the three-way valve member 1202 within the conduit 700. The position selector 604 is shown to be oriented in a vertical manner. When in the second orientation, the valve member 1202 is essentially rotated 180 degrees from the corresponding conduit 700 orientation. For example, the first passage 1204 which engages with the input port 708 is instead rotated 90 degrees counterclockwise, such that the first passage 1204 engages with the output port 712 while a third passage 1208 which engages with the output port 712 is instead rotated 180 degrees to engage with the input port 708. However, most significantly, rather than the second passage 1206 engaging with the bypass port 1206, the valve member 1202 is instead rotated 180 degrees, such that the bypass port 710 is blocked.

In addition, because the orientation of the valve stem 702 and valve member 1202 are aligned, a user may surmise, based on the flow through the conduit, how the valve is oriented. For example, if a user installs the actuator 600 as shown in FIG. 12 onto the valve, and notices that the valve stem 702 is oriented as shown while the position selector 604 is rotated to the right as shown, and that fluid is prohibited from entering the conduit from the coil return line 908, while the second fluid supply line 902 is able to freely pass through the conduit and exit through the output port 712, the user may determine that the valve is in a first orientation, where the input port 708 is closed and a full bypass is enacted. The user may then rotate the position selector 604 counter clockwise by 90 degrees, such that the valve member 1202 will be oriented 180 degrees from the corresponding conduit orientation. In other words, the valve member 1202 is parallel to the corresponding conduit orientation, but the bypass port 710 is positioned opposite from the bypass port 1206 of the valve member 1202, instead of aligning therewith. When in the second orientation, the coil may be open and bypass may be closed, such that the fluid flows into the conduit through the input port 708, and exits the conduit through the output port 712, while the bypass port 710 is blocked.

In this way, the valve repositioning system 500 may be configured to receive an input as to a desired valve orientation (i.e., whether to have the input, output, or bypass open or closed) and may determine a current valve orientation based on a sensed condition. The valve repositioning system may then be configured to control the motor to rotate the valve by a multiple of 90 degrees to be oriented in the desired valve orientation. In addition, while the orientations shown in FIGS. 10-13 depict a straightforward orientation where the valve stem 702 is oriented to align with the position selector 604 and the valve member 1002, 1202, it should be appreciated that, depending on how the actuator 600 is installed on the valve, the valve stem 702, position selector 604, and valve member 1002, 1202 may not all align. In this instance, the system may be configured to still determine the current valve orientation by sensing a condition corresponding to a current valve orientation. For example, a temperature sensor 518 may be used to measure the temperature of fluid flow through the conduit in the current valve orientation and compare the sensed condition (e.g., the temperature measurement) to a predetermined temperature measurement that is associated with the desired valve orientation.

Phase Correction

Referring now to FIGS. 14-23, a phase correction process is shown, which demonstrates how the valve repositioning system 500 is configured to determine a current valve orientation and, responsive to determining the current valve orientation, control the motor the rotate the valve to the desired valve orientation. Referring now to FIGS. 14-15, a conduit 802 having a two-way valve member 1002 positioned therein is shown, according to an exemplary embodiment. An actuator 600 having a motor is coupled to the valve member 1002. The motor 504 of the actuator 600 is configured to control the orientation of the valve. As shown in FIG. 14, the valve stem 702 is in a vertical orientation, while the position selector 604 is aligned perpendicularly (e.g., in a horizontal manner). The valve orientation allows for selective flow through the coil 814 (i.e., fluid flow is permitted to enter the input port 808 from the coil return line 908, to pass through the conduit 802 and exit through the output port 810). As the coil return 908 passes through the conduit 802, the system detects a change in temperature of the fluid flow through the conduit 802. In this instance, the system may determine that the valve is in an open condition, and accordingly can determine the current valve orientation. In FIG. 15, the processor 508 of the valve repositioning system 500 may receive a request for a desired valve location. For example, if the desired valve orientation for FIG. 15 is moving the valve to a closed circuit orientation, the processor 508 may be configured to control the motor 504 to move the valve member 1002 into the desired valve orientation. That is, the motor 504 may rotate the valve member 1002 90 degrees counterclockwise. The processor 508 may then be configured to sense a condition corresponding to a current valve orientation following movement by the motor 504. That is, the system may be configured to again measure the temperature of fluid flow through the conduit 802, and determine that because the circuit is closed, there is no change in temperature from the coil 814. One would expect a desired valve orientation of a closed circuit to provide no change in temperature from the coil 814. Accordingly, the system can determine that the sensed condition indicates that the current valve orientation matches the desired valve orientation from the request, and has successfully performed a phase correction.

Referring now to FIGS. 16-17, a conduit 700 having a three-way valve 1202 positioned therein is shown, according to an exemplary embodiment. An actuator 600 having a motor 504 is coupled to the valve. The motor 504 is configured to control the orientation of the valve. While described herein as a three-way valve 1202, in various embodiments, the actuator 600 may be configured to be coupled to a six-way valve (such as the valve depicted in FIG. 7B). Accordingly, actuator 600 may be configured to control the orientation of both three-way and six-way valves. As shown in FIG. 16, the valve stem 702 is in a vertical orientation, with the bypass facing to the right, while the position selector 604 is oriented in a horizontal manner. The valve orientation allows for flow through the coil 906 (i.e., fluid flow is permitted to enter the input port 708 from the coil return line 908, to pass through the conduit 700 and exit through the output port 712). In addition, the second passage 1206 aligns with the bypass port 710, such that the system is in an open coil, full bypass condition. As the coil return 908 and second supply line 902 pass through the conduit 700, the system detects a change in temperature of the fluid flow through the conduit 700. In this instance, the system can determine the current valve orientation. In FIG. 17, the processor 508 of the valve repositioning system 500 may receive a request for a desired valve orientation. For example, if the desired valve orientation for FIG. 17 is moving the valve to a closed coil, full bypass orientation, the processor 508 may be configured to control the motor 504 to move the valve into the desired valve orientation. That is, the motor 504 may rotate the valve 1202 90 degrees counterclockwise. The processor 508 may then be configured to sense a condition corresponding to a current valve orientation following movement by the motor 504. That is, the system may be configured to again measure the temperature of fluid flow through the conduit 700, and determine that the system detects no change in temperature from the full bypass. Accordingly, the system can determine that the sensed condition indicates that the current valve orientation matches the desired valve orientation from the request, and has successfully performed a phase correction.

Figure 18:
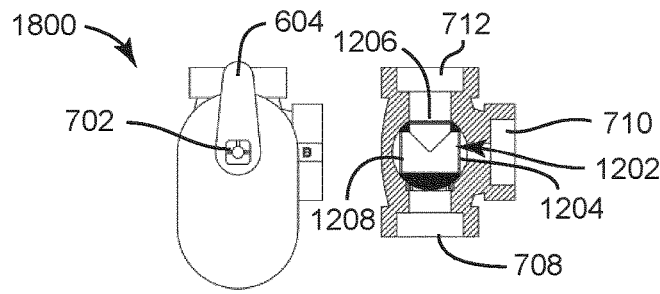
FIG. 18 is an example of a conduit having a three-way valve, where the valve is installed in an orientation that does not match the second desired orientation, according to an exemplary embodiment.
Figure 19:
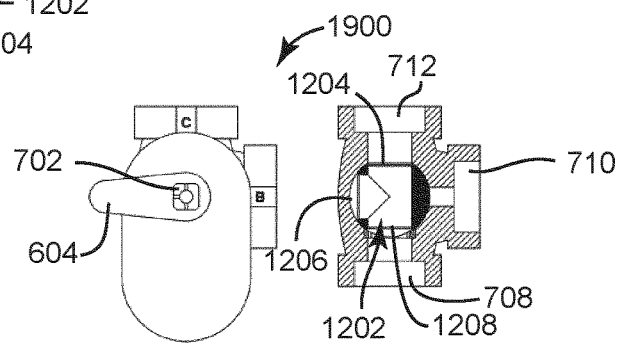
FIG. 19 is an example of a conduit having a three-way valve, where the valve of FIG. 18 is phase corrected so that the current orientation is rotated to match the desired orientation, according to an exemplary embodiment.

Referring now to FIGS. 18-19, a conduit 700 having a three-way valve 1202 positioned therein is shown, according to an exemplary embodiment. An actuator 600 having a motor 504 is coupled to the valve. The motor 504 is configured to control the orientation of the valve. As shown in FIG. 18, the valve stem 702 is in a horizontal orientation, with the bypass facing vertically upward, while the position selector 604 is oriented in a vertical manner. The valve orientation allows for no flow through the coil 906 (i.e., fluid flow is prohibited from entering the input port 708 from the coil return line 908 and passing through the conduit 700 to exit through the output port 712), and a full bypass (i.e., the first supply line 902 may enter the conduit 700 through the bypass port 710 and exit through the output port 712). In addition, the second passage 1206 aligns with the output 712 while the first passage 1204 aligns with the bypass port 710, such that the system is in a full bypass condition. As the first supply 902 passes through the conduit 700, the system detects no change in temperature of the fluid flow through the bypass port 710 only. In this instance, the system can determine the current valve orientation.

In FIG. 19, the processor 508 of the valve repositioning system 500 may receive a request for a desired valve orientation. For example, if the desired valve orientation for FIG. 19 is moving the valve to an open coil, no bypass orientation, the processor 508 may be configured to control the motor 504 to move the valve into the desired valve orientation. That is, the motor 504 may rotate the valve 1202 90 degrees counterclockwise. The processor 508 may then be configured to sense a condition corresponding to a current valve orientation following movement by the motor 504. That is, the system may be configured to again measure the temperature of fluid flow through the conduit 700, and determine that the system detects a change in temperature from the flow through the coil 906. Accordingly, the system can determine that the sensed condition indicates that the current valve orientation matches the desired valve orientation from the request, and has successfully performed a phase correction.

Figure 20:
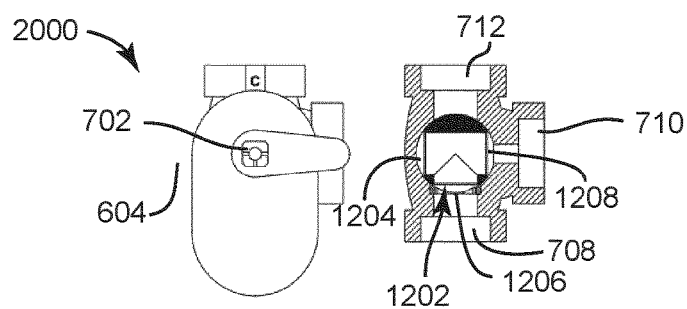
FIG. 20 is an example of a conduit having a three-way valve, where the valve is installed in an orientation that does not match the first desired orientation, according to an exemplary embodiment.
Figure 21:
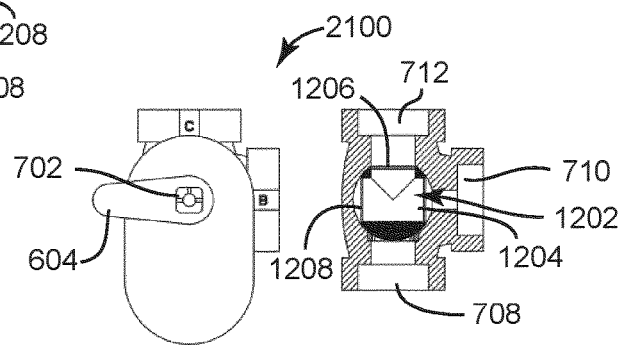
FIG. 21 is an example of a conduit having a three-way valve, where the valve of FIG. 20 is phase corrected so that the current orientation is rotated to match the desired orientation, according to an exemplary embodiment.

Referring now to FIGS. 20-21, a conduit 700 having a three-way valve 1202 positioned therein is shown, according to an exemplary embodiment. An actuator 600 having a motor 504 is coupled to the valve. The motor 504 is configured to control the orientation of the valve. As shown in FIG. 20, the valve stem 702 is in a horizontal orientation, with the bypass facing vertically downward, while the position selector 604 is oriented in a horizontal manner to the right. The valve orientation blocks fluid flow return to the system (i.e., fluid flow is entering the conduit 700 through the two inputs—the input port 708 and the bypass port 710—but is precluded from exiting the conduit 700). In this instance, the system cannot determine whether the change in temperature is due to the coil 906 or the full bypass. Accordingly, the valve repositioning cannot determine the current valve orientation from the one sensed condition. Instead, because the sensed condition does not correspond with any particular desired valve orientation, the processor 508 controls the motor 504 to selectively rotate the valve by a multiple of 90 degrees.

In FIG. 21, the processor 508 of the valve repositioning system 500 may receive a request for a desired valve orientation. For example, if the desired valve orientation for FIG. 21 is moving the valve to a closed coil, full bypass orientation, the processor 508 may be configured to control the motor 504 to move the valve into the desired valve orientation. That is, the motor 504 may rotate the valve 1202 180 degrees counterclockwise. The processor 508 may then be configured to re-sense a condition corresponding to a current valve orientation following movement by the motor 504, since the previous valve orientation could not be definitively determined. The system may be configured to again measure the temperature of fluid flow through the conduit 700, and determine that the system detects no change in temperature from the full bypass. Accordingly, the system can determine that the sensed condition indicates that the current valve orientation matches the desired valve orientation from the request, and has successfully performed a phase correction.

Figure 22:
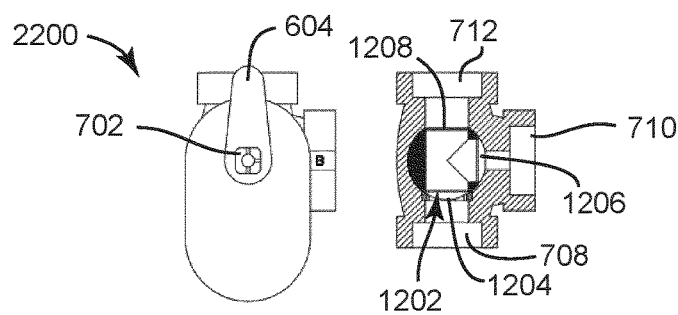
FIG. 22 is an example of a conduit having a three-way valve, where the valve is installed in an orientation that does not match the second desired orientation, according to an exemplary embodiment.
Figure 23:
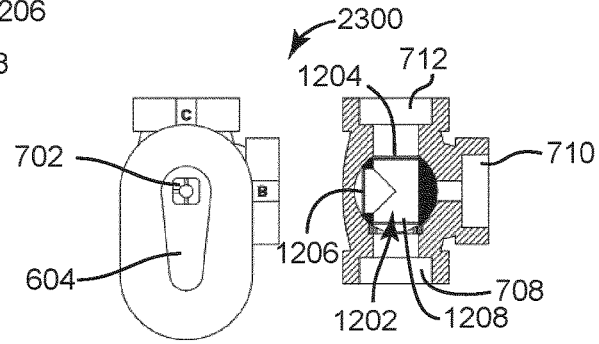
FIG. 23 is an example of a conduit having a three-way valve, where the valve of FIG. 22 is phase corrected so that the current orientation is rotated to match the desired orientation, according to an exemplary embodiment.

Referring now to FIGS. 22-23, a conduit 700 having a three-way valve 1202 positioned therein is shown, according to an exemplary embodiment. An actuator 600 having a motor 504 is coupled to the valve. The motor 504 is configured to control the orientation of the valve. As shown in FIG. 22, the valve stem 702 is in a horizontal orientation, with the bypass facing horizontally to the right, while the position selector 604 is oriented in a vertically upward manner. The valve orientation allows for an open coil and a full bypass to the system (i.e., fluid flow is entering the conduit 700 through the two inputs—the input port 708 and the bypass port 710—and is exiting through the output port 712 of the conduit 700). In this instance, the system detects minimal change in temperature from reduced flow through the coil 906, and least resistance flow through the bypass. Accordingly, the valve repositioning system determines the current valve orientation from the one sensed condition. In FIG. 23, the processor of the valve repositioning system may receive a request for a desired valve orientation. For example, if the desired valve orientation for FIG. 23 is moving the valve to an open coil, no bypass orientation, the processor 508 may be configured to control the motor 504 to move the valve into the desired valve orientation. That is, the motor 504 may rotate the valve 1202 180 degrees counterclockwise. The processor may then be configured to re-sense a condition corresponding to a current valve orientation following movement by the motor 504. The system may be configured to again measure the temperature of fluid flow through the conduit 700, and determine that the system detects a change in temperature from through the coil 906. Accordingly, the system can determine that the sensed condition indicates that the current valve orientation matches the desired valve orientation from the request, and has successfully performed a phase correction.

Method of Controlling Fluid Flow

Figure 24:
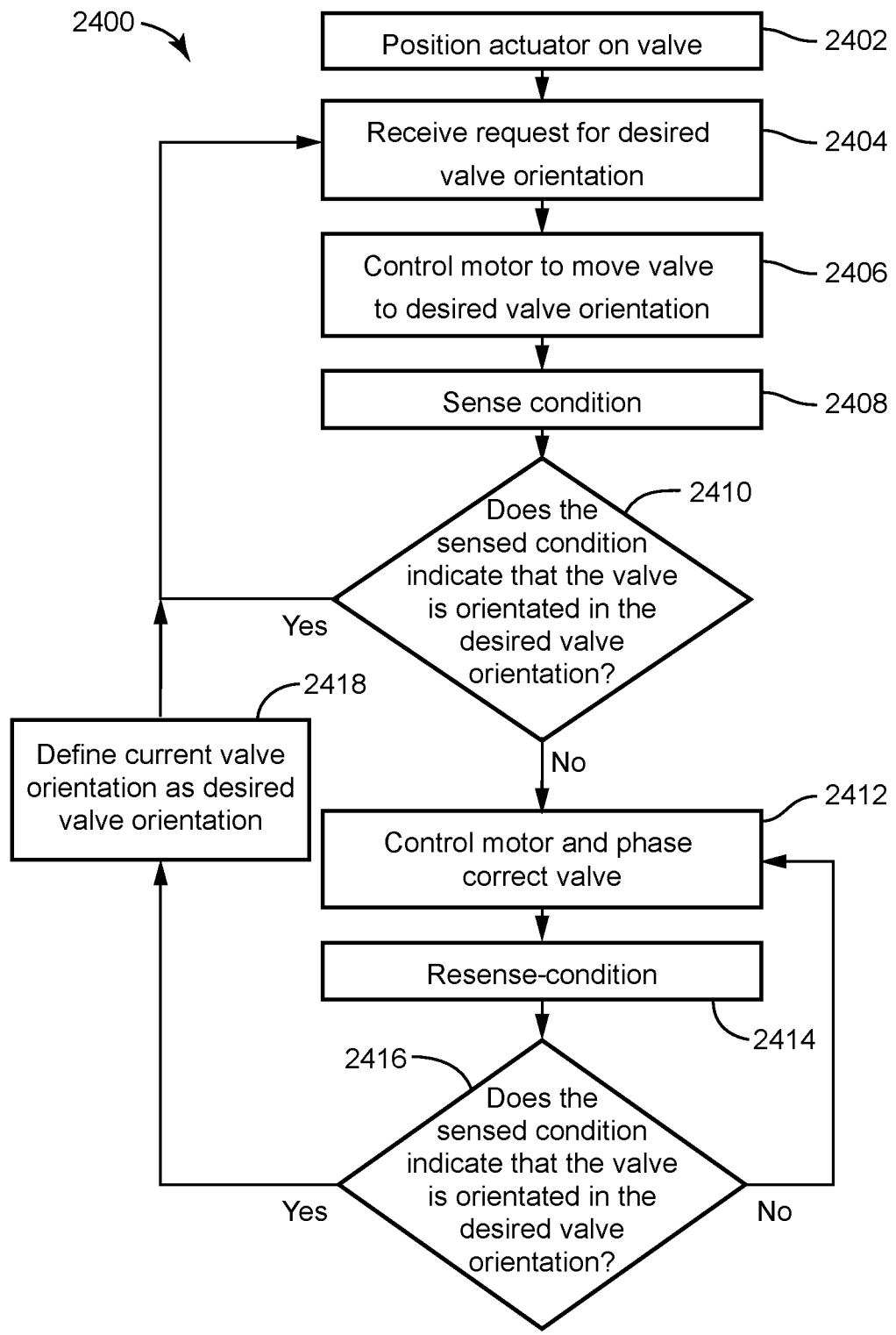
FIG. 24 is a flowchart of a process for controlling a valve, according to an exemplary embodiment.

Referring now to FIG. 24, a flowchart of a process for controlling a valve is shown. Specifically, the method 2400 describes a process for controlling fluid flow through a conduit having a valve therein. The method 2400 of controlling the fluid flow is applicable to two-way valves, three-way valves, or valves having any other number of ports. Step 2402 of the method includes positioning an actuator 502 on a valve. The valve is configured to be positioned in the conduit, and to change fluid flow through the conduit. For example, the actuator 600 of FIG. 6 is configured to be positioned on and coupled to the valve of FIG. 7 (e.g., either the three-way or six-way valve) by engaging the posts 606 of the actuator 600 with the corresponding receivers of the conduit 700. As described above, when the actuator 600 is positioned on the conduit, the valve body 702 is configured to be received within the cavity of the conduit. In addition, the position selector 604 is configured to engage with the valve stem 702. The actuator 600 may be coupled to the motor 504, wherein the motor 504 is configured to control an orientation of the valve.

At step 2404, the system is configured to receive a request for a desired valve orientation. For example, the system of FIG. 5 is shown to include an actuator controller 506 that includes a processor 508 and memory 510. The memory 510 may be configured to store instructions that, when executed by the processor 508, cause the processor 508 to receive a request for a desired valve orientation.

Step 2406 includes controlling the motor 504 to move the valve to the desired valve orientation. Specifically, the memory 510 within the actuator controller 506 may be configured to store instructions that, when executed by the processor 508, cause the processor 508 to control the motor 504 to move the valve into the desired valve orientation. For example, the processor 508 may indicate that the valve body must rotate clockwise 90 degrees to open the flow.

Step 2408 includes the step of sensing a condition. The sensed condition corresponds to a current valve orientation following movement by the motor 504 (e.g., at step 2406). In some embodiments, a sensor may be configured to sense a condition based on an orientation of the valve within the conduit. For example, a temperature sensor 518 may be configured to detect a temperature measurement of the conduit to infer a temperature or existence of fluid flow through the conduit.

Step 2410 further includes determining whether the sensed condition indicates that the valve is oriented in the desired valve orientation. In other words, step 2410 includes determining if the sensed condition indicates that the current valve orientation matches the desired valve orientation from the request. The determination of whether the current valve orientation matches the desired valve orientation includes comparing the sensed condition that corresponds to the current valve orientation to a predetermined sensed condition associated with the desired valve orientation (e.g., a temperature measurement or other sensed condition stored in memory 510). If the sensed condition indicates that the valve is oriented in the desired valve orientation, the system may be configured to return to step 2404, where the system is ready to rotate to a new desired valve orientation. However, if the sensed condition indicates that the valve is not oriented in the desired valve orientation (i.e., the current valve orientation does not match the desired valve orientation), then the system may, per step 2412, control the motor 504 to phase correct the valve. For example, if the sensed condition is a temperature measurement, the system may compare the temperature measurement based on fluid flow through the conduit to a predetermined sensed condition. The predetermined sensed condition may be, for example, a temperature which changes with the orientation of the valve within the conduit. The predetermined sensed condition may be a valve stored in the temperature database 516 of the memory 510.

In some embodiments, such as in the instance of two-way valves, the valve may be rotated to phase correct upon one determination that the current valve orientation does not match the desired valve orientation. However, in various configurations of the valve repositioning system 500, the system may instead be configured to control the motor 504 to selectively rotate the valve in a direction to move the valve towards the desired valve orientation. The valve repositioning system 500 may be configured to phase correct the by 90 degrees (e.g., for two-way valves) or by multiples of 90 degrees (e.g., for three-way valves and/or six-way valves) by generating corresponding signals for the motor 504.

Step 2414 further includes the step of re-sensing a condition. For example, referring to the conduit having a three-way valve of FIGS. 19-20, the system may, under limited circumstances, be unable to definitively determine a current valve orientation based on a sensed condition, such as when fluid is being input into the conduit through an input port 708 and a bypass port 710 but unable to exit through an output port 712. In this instance, the system may be required to re-sense the condition after the valve has been rotated by the motor 504, in order to determine a current valve orientation. Accordingly, step 2416 includes the step of determining if the sensed condition indicates that the valve is located in the desired valve orientation.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the HVAC actuator and assembly thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A system for controlling a valve for a fluid through conduit, the system comprising:
   a valve configured to be oriented in a conduit and change fluid flow through the conduit;
   an actuator coupled to the valve and comprising a motor configured to control an orientation of the valve;
   a sensor configured to sense a condition of the fluid related to a current valve orientation of the valve within the conduit; and
   an actuator controller comprising a processor and memory, the memory storing instructions that, when executed by the processor, cause the processor to perform operations, the operations comprising:

receiving a request for a desired valve orientation;
controlling the motor to move the valve into the desired valve orientation;
sensing the condition related to the current valve orientation following movement by the motor;
determining if the condition indicates that the current valve orientation matches the desired valve orientation from the request; and
responsive to determining that the current valve orientation does not match the desired valve orientation from the request, controlling the motor to selectively rotate the valve in a direction to move the valve towards the desired valve orientation.

2. The system of claim 1, wherein determining if the sensed condition indicates that the current valve orientation matches the desired valve orientation comprises:
comparing the sensed condition that corresponds to the current valve orientation to a predetermined sensed condition associated with the desired valve orientation.

3. The system of claim 2, wherein the sensor is a temperature sensor configured to detect a temperature measurement based on fluid flow through the conduit, and wherein the predetermined sensed condition is a temperature which changes with the orientation of the valve within the conduit.

4. The system of claim 1, wherein the operations further comprise:
responsive to controlling the motor to selectively rotate the valve in the direction to move the valve towards the desired valve orientation, re-sensing a condition corresponding to the current valve orientation; and
determining whether the re-sensed condition indicates that the current valve orientation matches the desired valve orientation,
wherein:
if the current valve orientation matches the desired valve orientation, the processor defines the current valve orientation as the desired valve orientation, and
if the current valve orientation does not match the desired valve orientation, the processor controls the motor to selectively rotate the valve in a direction to move the valve towards the desired valve orientation and repeat until the current valve orientation is the desired valve orientation.

5. The system of claim 1, wherein the valve comprises:
a six-way valve that is configured to phase correct by a multiple of 90 degrees upon being selectively rotated by the motor.

6. The system of claim 1, wherein the operations further comprise:
responsive to determining that the sensed condition indicates that the current valve orientation matches the desired valve orientation following selectively rotating the valve, defining the current valve orientation as the desired valve orientation.

7. A system for controlling a valve, the system comprising:
a valve configured to be oriented in a conduit and change fluid flow through the conduit;
an actuator coupled to the valve and comprising a motor configured to control an orientation of the valve;
a sensor configured to sense a condition based on an orientation of the valve within the conduit; and
an actuator controller comprising a processor and memory, the memory storing instructions that, when executed by the processor, cause the processor to perform operations, the operations comprising:
receiving a request for a desired valve orientation;
controlling the motor to move the valve into the desired valve orientation;
sensing the condition corresponding to a current valve orientation following movement by the motor;
determining if the condition indicates that the current valve orientation matches the desired valve orientation from the request; and
responsive to determining that the current valve orientation does not match the desired valve orientation from the request, controlling the motor to selectively rotate the valve in a direction to move the valve towards the desired valve orientation, wherein responsive to determining that the current valve orientation does not match the desired valve orientation from the request, controlling the motor to selectively rotate the valve by a multiple of 90 degrees to phase correct to the desired valve orientation.

8. A system for controlling a valve, the system comprising:
a valve configured to be oriented in a conduit and change fluid flow through the conduit;
an actuator coupled to the valve and comprising a motor configured to control an orientation of the valve;
a sensor configured to sense a condition based on an orientation of the valve within the conduit; and
an actuator controller comprising a processor and memory, the memory storing instructions that, when executed by the processor, cause the processor to perform operations, the operations comprising:
receiving a request for a desired valve orientation;
controlling the motor to move the valve into the desired valve orientation;
sensing the condition corresponding to a current valve orientation following movement by the motor;
determining if the condition indicates that the current valve orientation matches the desired valve orientation from the request; and
responsive to determining that the current valve orientation does not match the desired valve orientation from the request, controlling the motor to selectively rotate the valve in a direction to move the valve towards the desired valve orientation, wherein the valve comprises:
a two-way valve that is configured to phase correct by 90 degrees upon being selectively rotated by the motor;
a three-way valve that is configured to phase correct by a multiple of 90 degrees upon being selectively rotated by the motor; or
a six-way valve that is configured to phase correct by a multiple of 90 degrees upon being selectively rotated by the motor.

9. A method for controlling a valve configured to be oriented in a conduit and change fluid flow of a fluid through the conduit, the method comprising:
positioning an actuator on the valve, wherein the valve is positioned in a conduit and configured to change fluid flow through the conduit;
receiving a request for a desired valve orientation;
controlling a motor of the actuator to move the valve into the desired valve orientation;
sensing a condition of the fluid based on an orientation of the valve within the conduit, wherein the sensed condition corresponds to a current valve orientation following movement by the motor;

determining the sensed condition indicates that the current valve orientation matches the desired valve orientation from the request; and responsive to determining that the current valve orientation does not match the desired valve orientation from the request, controlling the motor to selectively rotate the valve in a direction to move the valve towards the desired valve orientation.

10. The method of claim 9, wherein responsive to determining that the current valve orientation does not match the desired valve orientation from the request, controlling the motor to selectively rotate the valve by a multiple of 90 degrees to phase correct to the desired valve orientation.

11. The method of claim 9, wherein determining that the sensed condition indicates that the current valve orientation is the desired valve orientation comprises comparing the sensed condition corresponding to the current valve orientation to a predetermined sensed condition stored in a memory corresponding to the desired valve orientation.

12. The method of claim 11, wherein the sensed condition is sensed by a temperature sensor that is configured to detect a temperature measurement based on fluid flow through the conduit, and wherein the predetermined sensed condition is a temperature which changes with the orientation of the valve within the conduit.

13. The method of claim 9, further comprising:
responsive to controlling the motor to selectively rotate the valve in the direction to move the valve towards the desired valve orientation, re-sensing a condition corresponding to the current valve orientation;
determining that the re-sensed condition indicates that the current valve orientation matches the desired valve orientation; and
defining the current valve orientation as the desired valve orientation responsive to the re-sensed condition indicating that the current valve orientation matching the desired valve orientation.

14. The method of claim 9, further comprising:
responsive to controlling the motor to selectively rotate the valve in the direction to move the valve towards the desired valve orientation, re-sensing a condition corresponding to the current valve orientation;
determining that the re-sensed condition indicates that the current valve orientation does not match the desired valve orientation; and
controlling the motor to selectively rotate the valve in a direction to move the valve towards the desired valve orientation and repeat until the current valve orientation is the desired valve orientation.

15. An actuator coupled to a valve, the actuator comprising:
a motor configured to control an orientation of the valve within a conduit; and
an actuator controller operatively connected to the motor and configured to selectively rotate the valve, the actuator controller comprising an actuator controller, the actuator controller comprising a processor and memory, the memory storing instructions that, when executed by the processor, cause the processor to perform operations, the operations comprising:
receiving a request for a desired valve orientation;
controlling the motor to move the valve into the desired valve orientation;
sensing a condition associated with a characteristic of a fluid within the conduit and corresponding to a current valve orientation following movement by the motor;
determining if the condition indicates that the current valve orientation matches the desired valve orientation from the request; and
responsive to determining that the current valve orientation does not match the desired valve orientation from the request, controlling the motor to selectively rotate the valve in a direction to move the valve towards the desired valve orientation.

16. The actuator of claim 15, wherein responsive to determining that the current valve orientation does not match the desired valve orientation from the request, controlling the motor to selectively rotate the valve by a multiple of 90 degrees to phase correct to the desired valve orientation to modulate fluid flow through the conduit.

17. The actuator of claim 15, wherein determining if the sensed condition indicates that the current valve orientation matches the desired valve orientation comprises:
comparing the sensed condition that corresponds to the current valve orientation to a predetermined sensed condition stored in the memory that is associated with the desired valve orientation.

18. The actuator of claim 17, wherein the sensed condition is sensed by a temperature sensor configured to detect a temperature measurement based on fluid flow through the conduit, and wherein the predetermined sensed condition is a temperature which changes with the orientation of the valve within the conduit.

19. The actuator of claim 15, wherein the sensed condition indicates the current valve orientation by indicating whether a respective flow through the valve is open or closed.

20. The actuator of claim 19, wherein the processor is further configured to perform the operations comprising:
responsive to controlling the motor to selectively rotate the valve in the direction to move the valve towards the desired valve orientation, re-sensing a condition corresponding to the current valve orientation; and
determining whether the re-sensed condition indicates that the current valve orientation matches the desired valve orientation,
wherein:
if the current valve orientation matches the desired valve orientation, the processor defines the current valve orientation as the desired valve orientation, and
if the current valve orientation does not match the desired valve orientation, the processor controls the motor to selectively rotate the valve in a direction to move the valve towards the desired valve orientation and repeat until the current valve orientation is the desired valve orientation.

21. The actuator of claim 15, wherein the valve comprises a six-way valve that is configured to phase correct by a multiple of 90 degrees upon being selectively rotated by the motor.

22. An actuator coupled to a valve, the actuator comprising:
a motor configured to control an orientation of the valve within a conduit; and
an actuator controller operatively connected to the motor and configured to selectively rotate the valve, the actuator controller comprising an actuator controller, the actuator controller comprising a processor and memory, the memory storing instructions that, when executed by the processor, cause the processor to perform operations, the operations comprising:
receiving a request for a desired valve orientation;

controlling the motor to move the valve into the desired valve orientation;

sensing a condition corresponding to a current valve orientation following movement by the motor;

determining if the condition indicates that the current valve orientation matches the desired valve orientation from the request; and responsive to determining that the current valve orientation does not match the desired valve orientation from the request, controlling the motor to selectively rotate the valve in a direction to move the valve towards the desired valve orientation, wherein the processor determines the multiple of 90 degrees to control the motor to selectively rotate the valve to the desired valve orientation based on the current valve orientation.

* * * * *